(12) United States Patent
Richards

(10) Patent No.: US 10,113,371 B2
(45) Date of Patent: *Oct. 30, 2018

(54) DOWNHOLE CONTROL LINE CONNECTOR

(71) Applicant: Halliburton Energy Services, Inc., Houston, TX (US)

(72) Inventor: William Mark Richards, Flower Mound, TX (US)

(73) Assignee: Halliburton Energy Services, Inc., Houston, TX (US)

(*) Notice: Subject to any disclaimer, the term of this patent is extended or adjusted under 35 U.S.C. 154(b) by 643 days.

This patent is subject to a terminal disclaimer.

(21) Appl. No.: 14/442,103

(22) PCT Filed: Jun. 30, 2014

(86) PCT No.: PCT/US2014/044783
§ 371 (c)(1),
(2) Date: May 12, 2015

(87) PCT Pub. No.: WO2016/003388
PCT Pub. Date: Jan. 7, 2016

(65) Prior Publication Data
US 2015/0376956 A1    Dec. 31, 2015

(51) Int. Cl.
*E21B 17/02* (2006.01)
*E21B 47/12* (2012.01)
(Continued)

(52) U.S. Cl.
CPC .......... *E21B 17/028* (2013.01); *E21B 47/123* (2013.01); *F16L 25/01* (2013.01);
(Continued)

(58) Field of Classification Search
CPC ........ F16L 25/01; F16L 25/02; H01R 13/005; E21B 17/028
See application file for complete search history.

(56) References Cited

U.S. PATENT DOCUMENTS 2,178,931 A * 11/1939 Crites .................. E21B 17/028
174/47
3,034,085 A * 5/1962 Pauler ..................... A47L 9/246
439/191
(Continued)

FOREIGN PATENT DOCUMENTS

WO    2016003388 A1    1/2016
WO    2016003390 A1    1/2016
(Continued)

OTHER PUBLICATIONS

International Search Report and Written Opinion for PCT/US2014/044783 dated Mar. 27, 2015.

*Primary Examiner* — Blake E Michener
(74) *Attorney, Agent, or Firm* — Benjamin Fite; Tumey L.L.P.

(57) ABSTRACT

An example connector includes a housing having a conduit chamber defined therein between a body and a shroud, a matable connector at least partially disposed within the housing and providing a mating face that faces tangentially with respect to the housing so as to mate tangentially with an opposing matable connector, and a splitter block coupled to the housing and conveying one or more communication media into the conduit chamber to communicate with the matable connector.

34 Claims, 13 Drawing Sheets

(51) Int. Cl.
*F16L 25/01* (2006.01)
*F16L 25/02* (2006.01)
*G02B 6/38* (2006.01)
*G02B 6/50* (2006.01)
*G02B 6/44* (2006.01)
*H01R 13/523* (2006.01)
*H01R 13/00* (2006.01)

(52) U.S. Cl.
CPC ............ *F16L 25/02* (2013.01); *G02B 6/3809* (2013.01); *G02B 6/4427* (2013.01); *G02B 6/506* (2013.01); *G02B 6/3816* (2013.01); *G02B 6/3823* (2013.01); *G02B 6/3849* (2013.01); *G02B 6/3878* (2013.01); *G02B 6/3887* (2013.01); *G02B 6/4457* (2013.01); *H01R 13/005* (2013.01); *H01R 13/523* (2013.01)

(56) References Cited

U.S. PATENT DOCUMENTS

| | | | | |
|---|---|---|---|---|
| 3,127,227 | A * | 3/1964 | Edwards | A47L 9/246 439/195 |
| 3,636,285 | A * | 1/1972 | Wickham | A47L 9/246 15/327.1 |
| 3,895,850 | A * | 7/1975 | Engle | B60T 17/043 303/15 |
| 3,928,715 | A * | 12/1975 | Holden | A47L 9/246 138/103 |
| 3,972,578 | A * | 8/1976 | Reynolds | A47L 9/246 174/47 |
| 4,094,535 | A * | 6/1978 | Minton | A47L 9/246 174/47 |
| 4,176,894 | A | 12/1979 | Godbey | |
| 4,345,805 | A * | 8/1982 | Finley | A47L 9/242 285/110 |
| 4,466,677 | A * | 8/1984 | Lyman | H01R 13/005 439/192 |
| 4,881,909 | A * | 11/1989 | Blackman | A47L 9/246 15/377 |
| 5,757,996 | A | 5/1998 | Vine | |
| 5,833,482 | A * | 11/1998 | Buchter | B60T 17/043 439/191 |
| 6,571,046 | B1 | 5/2003 | Hickey et al. | |
| 6,705,478 | B1 * | 3/2004 | Engle | B60D 1/64 213/1.3 |
| 6,755,253 | B2 | 6/2004 | Smith et al. | |
| 7,100,690 | B2 | 9/2006 | Mullen et al. | |
| 7,222,676 | B2 | 5/2007 | Patel et al. | |
| 7,226,302 | B2 * | 6/2007 | Walter | A47L 9/246 15/377 |
| 7,398,822 | B2 | 7/2008 | Meijer et al. | |
| 7,487,830 | B2 | 2/2009 | Wolters et al. | |
| 7,503,395 | B2 | 3/2009 | Meijer et al. | |
| 7,556,093 | B2 | 7/2009 | Grigsby et al. | |
| 7,594,763 | B2 | 9/2009 | Richards et al. | |
| 7,594,796 | B2 | 9/2009 | De La Grandmaison et al. | |
| 7,900,698 | B2 | 3/2011 | Stoesz | |
| 8,079,419 | B2 | 12/2011 | Richards | |
| 8,122,967 | B2 | 2/2012 | Richards | |
| 8,371,396 | B2 | 2/2013 | Braden et al. | |
| 8,794,337 | B2 | 8/2014 | Thomas et al. | |
| 9,404,314 | B2 | 8/2016 | Perez et al. | |
| 2002/0135179 | A1 | 9/2002 | Boyle et al. | |
| 2003/0173077 | A1 | 9/2003 | Smith et al. | |
| 2004/0159444 | A1 | 8/2004 | Wolters et al. | |
| 2004/0173352 | A1 | 9/2004 | Mullen et al. | |
| 2004/0216872 | A1 | 11/2004 | Foster et al. | |
| 2005/0232548 | A1 | 10/2005 | Ringgenberg | |
| 2006/0108803 | A1 | 5/2006 | Reynolds | |
| 2006/0159400 | A1 * | 7/2006 | Richards | E21B 17/028 385/53 |
| 2006/0260817 | A1 | 11/2006 | Meijer et al. | |
| 2007/0134954 | A1 * | 6/2007 | Jacobsen | H01R 13/22 439/108 |
| 2007/0159351 | A1 | 7/2007 | Madhavan et al. | |
| 2007/0167051 | A1 * | 7/2007 | Reynolds, Jr. | E21B 17/028 439/194 |
| 2008/0311776 | A1 | 12/2008 | Cox et al. | |
| 2009/0045146 | A1 * | 2/2009 | Stoesz | E21B 17/028 210/767 |
| 2009/0050327 | A1 | 2/2009 | Anderson et al. | |
| 2009/0078430 | A1 | 3/2009 | Du | |
| 2010/0264650 | A1 | 10/2010 | Braden et al. | |
| 2011/0108288 | A1 | 5/2011 | Richards | |
| 2012/0181045 | A1 | 7/2012 | Thomas et al. | |
| 2013/0327546 | A1 | 12/2013 | Rytlewski | |
| 2014/0110122 | A1 | 4/2014 | Henschel et al. | |
| 2015/0204145 | A1 | 7/2015 | Richards et al. | |
| 2015/0368983 | A1 | 12/2015 | Perez | |
| 2015/0376956 | A1 | 12/2015 | Richards | |
| 2016/0168923 | A1 * | 6/2016 | Richards | E21B 47/12 166/250.01 |
| 2016/0258229 | A1 * | 9/2016 | Delzell | E21B 17/025 |
| 2016/0273279 | A1 * | 9/2016 | Richards | E21B 47/12 |
| 2016/0290062 | A1 * | 10/2016 | Richards | E21B 17/02 |
| 2016/0290063 | A1 * | 10/2016 | Richards | E12B 17/003 |
| 2017/0138131 | A1 * | 5/2017 | Richards | E21B 17/02 |

FOREIGN PATENT DOCUMENTS

| | | |
|---|---|---|
| WO | 2016003392 A1 | 1/2016 |
| WO | 2016003393 A1 | 1/2016 |
| WO | 2016003394 A1 | 1/2016 |
| WO | 2016003397 A1 | 1/2016 |

* cited by examiner

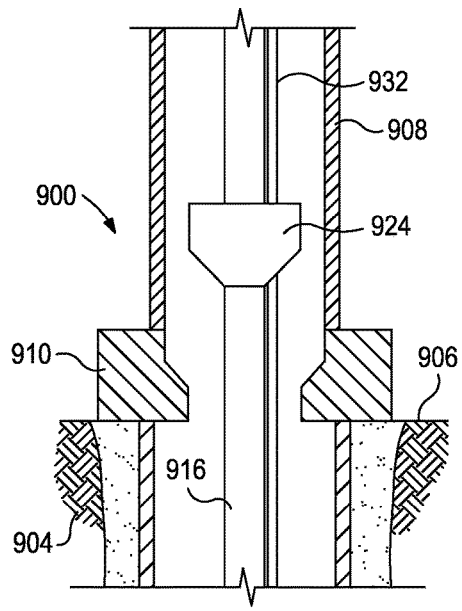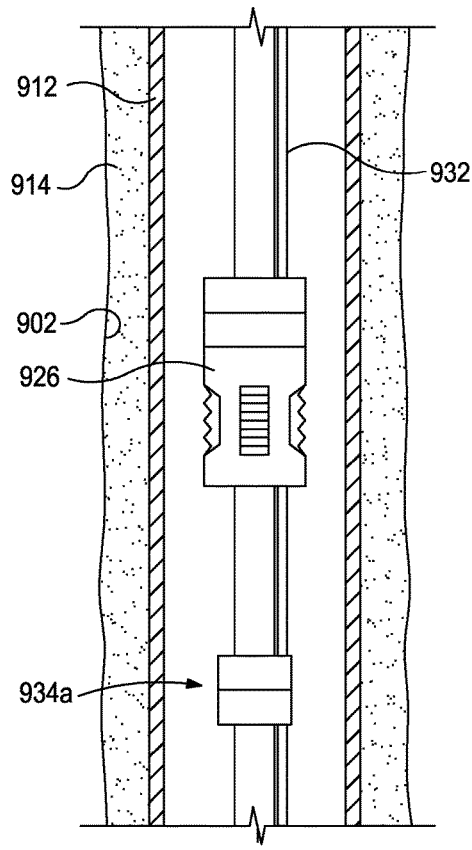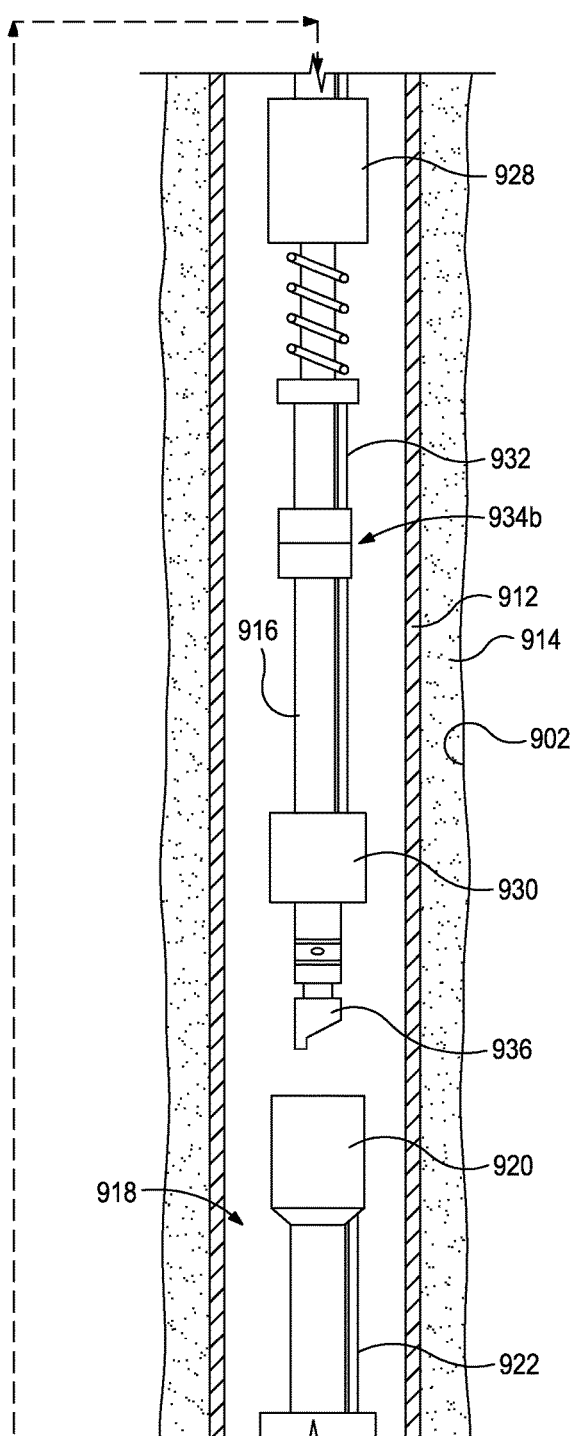
FIG. 9A    FIG. 9B

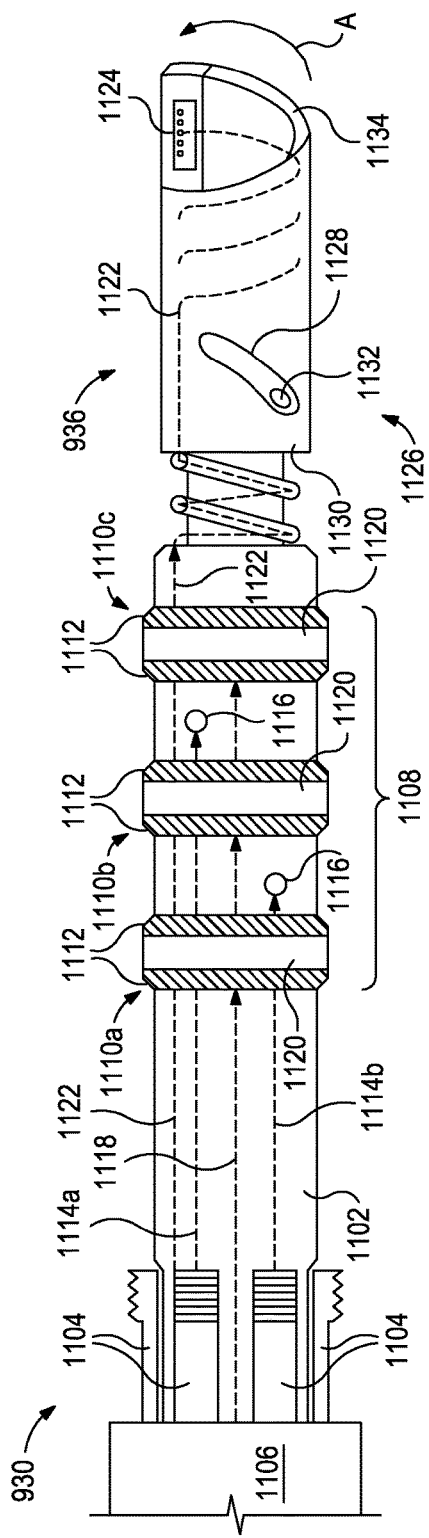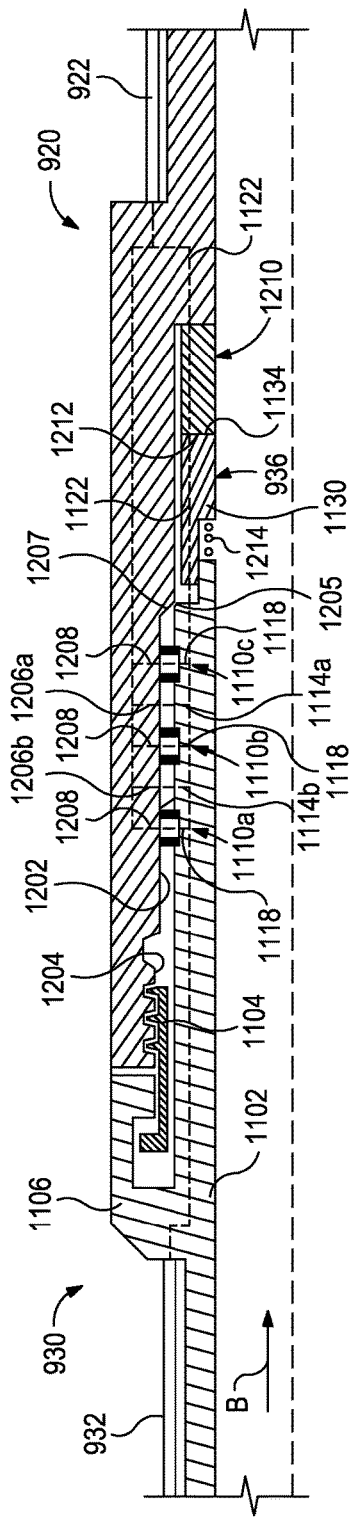
FIG. 11
FIG. 12

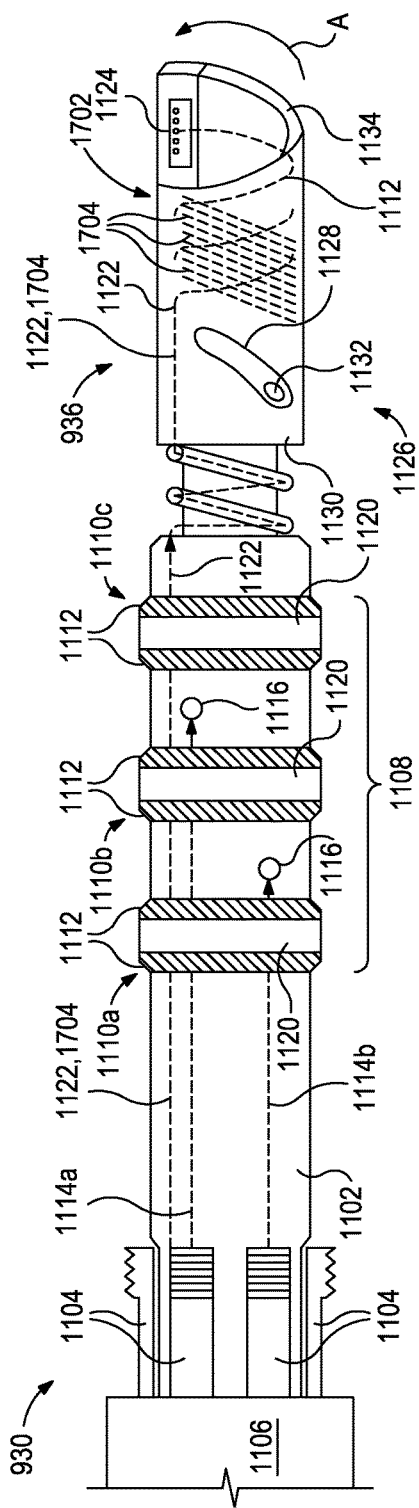
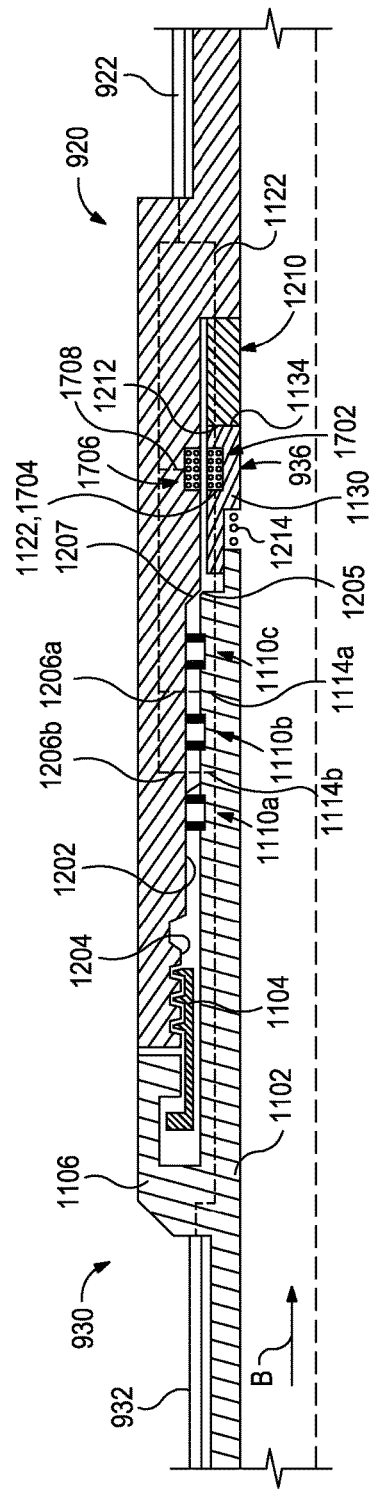
FIG. 17A
FIG. 17B

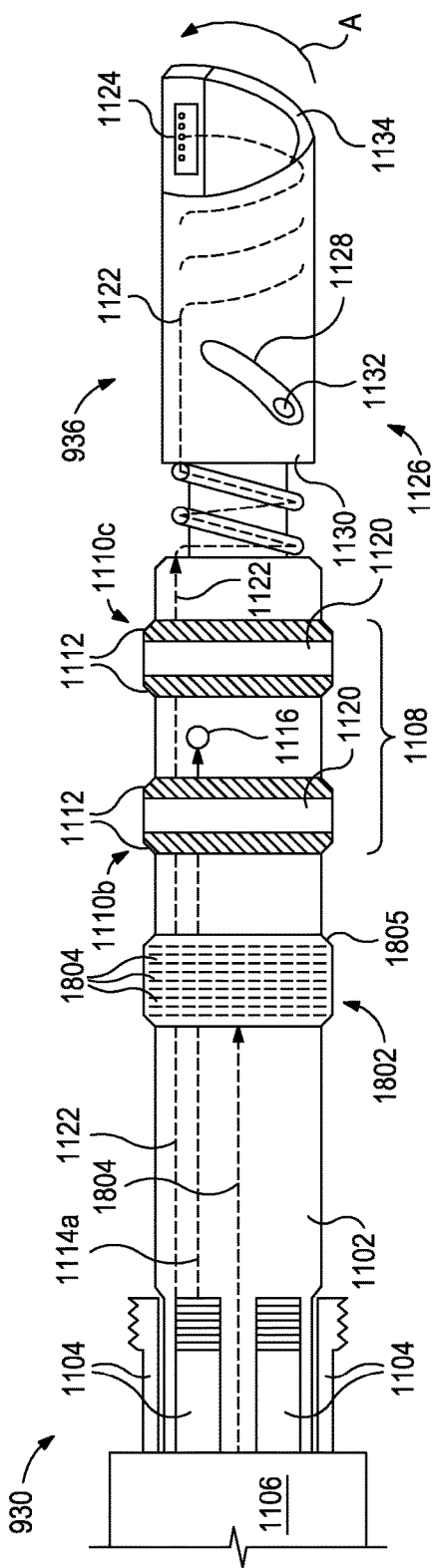
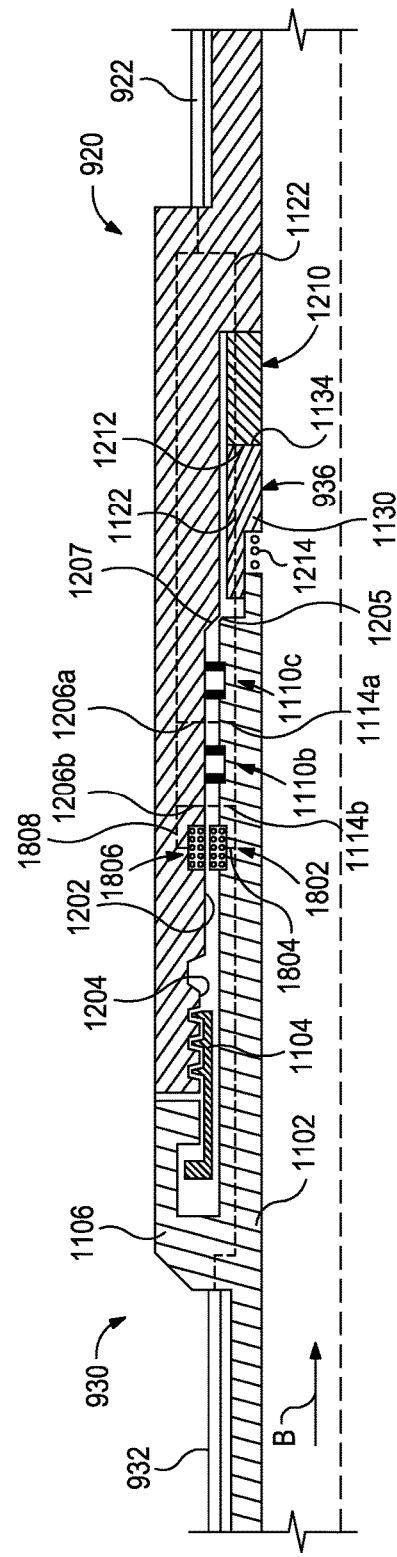
FIG. 18A
FIG. 18B

DOWNHOLE CONTROL LINE CONNECTOR

BACKGROUND

The present disclosure relates generally to equipment utilized and operations performed in conjunction with subterranean wells and, more particularly, to a control line connector assembly for downhole use.

In the oil and gas industry, control lines are often run along the exterior of production tubing or other wellbore tubulars extended into a wellbore to communicate between a surface location and a downhole location. The control lines, which may include optical fibers, electrical conductors, or hydraulic conduits, enable the transmission of signals, downhole data acquisition, activation and control of downhole devices, and numerous other applications. For example, command and control signals may be sent from a surface location downhole through a control line and to a downhole tool located within the wellbore. In other applications, downhole sensors collect data and relay that data to the surface location through a control line uplink for evaluation or use in the specific well-related operation. In yet other applications, hydraulic pressure is conveyed through the control lines to act on or otherwise actuate one or more downhole tools or devices.

Fiber optic control lines, in particular, can provide valuable downhole sensing means in a wellbore environment. For instance, optical fibers are often used to obtain distributed temperature measurements along all or a portion of the wellbore. When used as a temperature sensor, optical fibers provide a more complete temperature profile as compared to discrete temperature sensors.

Use of an optical fiber for distributed downhole temperature sensing may be highly beneficial during wellbore completion operations. In a stimulation operation, for instance, a temperature profile may be obtained to determine where injected fluid has entered surrounding formations or zones intersected by the wellbore. This information is useful in evaluating the effectiveness of the stimulation treatment and in planning future stimulation operations. Likewise, use of an optical fiber may also be highly beneficial during production operations. For example, a distributed temperature profile may be used in determining the location of water or gas influx along the sand control screens during production.

In a typical wellbore completion, lower portions of the completion string include various tools such as sand control screens, fluid flow control devices, and wellbore isolation devices. Various sensors, such as an optical fiber, may also be included in the lower portions of the completion string. After the completion process is finished, an upper portion of the completion string is separated from the lower portion of the completion string and retrieved to the surface, which simultaneously disconnects the optical fiber from surface communication. Accordingly, if information from the production zones is to be transmitted to the surface during production operations, a connection to the optical fiber in the completion string must be reestablished when production tubing string is installed. This can be done using either a dry or wet mate fiber optic connector, although wet mate connectors are more prevalent in downhole environments.

It has been found, however, that wet mating optical fibers in a downhole environment can be quite difficult. Currently, most wet mate connectors use a telescoping metal housing (including male and female portions) that locates, aligns, and washes the face of the connection. In operation, the male and female wet mate housings are first aligned, and then the respective wet mate faces are brought together axially. The male and female wet mate housings are then axially compressed such that an inner housing moves inside an outer housing and the optical fibers align internally within the housings. The telescoping inner and outer housings bring the end faces of each fiber in contact.

While generally able to establish optical communication between upper and lower ends of an optical fiber, conventional fiber optic connectors suffer from at least two inherent flaws. First, the mating faces of conventional fiber optic connectors are axially disposed and thereby increasingly prone to soiling by grease, scale, and other debris commonly encountered in the downhole environment. Second, a short length of fiber inside the fiber optic connector is subjected to column loading and is, therefore, prone to buckling or breaking.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIGS. 9A and 9B illustrate partial cross-sectional side views of another wellbore system that may employ the principles of the present disclosure, according to one or more embodiments.

FIG. 11 illustrates an enlarged side view of the anchor assembly and upper control line connector of FIG. 9B, according to one or more embodiments.

FIG. 12 illustrates a cross-sectional side view of the anchor assembly engaged with the completion receptacle of FIG. 9B, according to one or more embodiments.

FIG. 17A illustrates an enlarged side view of an anchor assembly and the upper control line connector of FIG. 9B, according to one or more embodiments.

FIG. 17B illustrates a cross-sectional side view of the anchor assembly of FIG. 17A engaged with the completion receptacle of FIG. 9B, according to one or more embodiments.

FIG. 18A illustrates an enlarged side view of an anchor assembly and the upper control line connector of FIG. 9B, according to one or more embodiments.

FIG. 18B illustrates a cross-sectional side view of the anchor assembly of GIG. 18A engaged with the completion receptacle of FIG. 9B, according to one or more embodiments.

DETAILED DESCRIPTION

The present disclosure relates generally to equipment utilized and operations performed in conjunction with subterranean wells and, more particularly, to a control line connector assembly for downhole use.

The presently disclosed control line connector assembly may be useful in establishing a connection between two ends of a control line configured to convey various forms of communication media into a downhole environment. In some cases, for instance, the control line connector assembly may be configured to establish a connection between the ends of one or more optical fibers. As opposed to conventional control line connection systems that establish connection through relative axial movement of connection housings, the currently disclosed connection assembly is configured to mate opposing ends of the optical fibers in a tangential or curvilinear direction and otherwise through rotation of the opposing connection housings. A retractable cover on one of the connection housings and a corresponding penetrable lid on the opposing connection housing ensure that the resulting connection is substantially free from debris and fouling. Once a connection is established, the optical fibers are maintained in low stress compression, thereby reducing the possibility of buckling or breakage.

While the various embodiments of the control line connector assembly detailed herein are generally described in conjunction with coupling optical fibers, those skilled in the art will readily appreciate that the control line connection system may equally be used in the coupling of other communication media such as, but not limited to, electrical conductors and hydraulic conduits. Moreover, the embodiments of the control line connector assembly may include wet mate or dry mate connectors. A wet mate connection may be mated downhole, while a dry mate connection could be made up during assembly while on a rig floor or otherwise prior to being introduced downhole.

Figure 1:
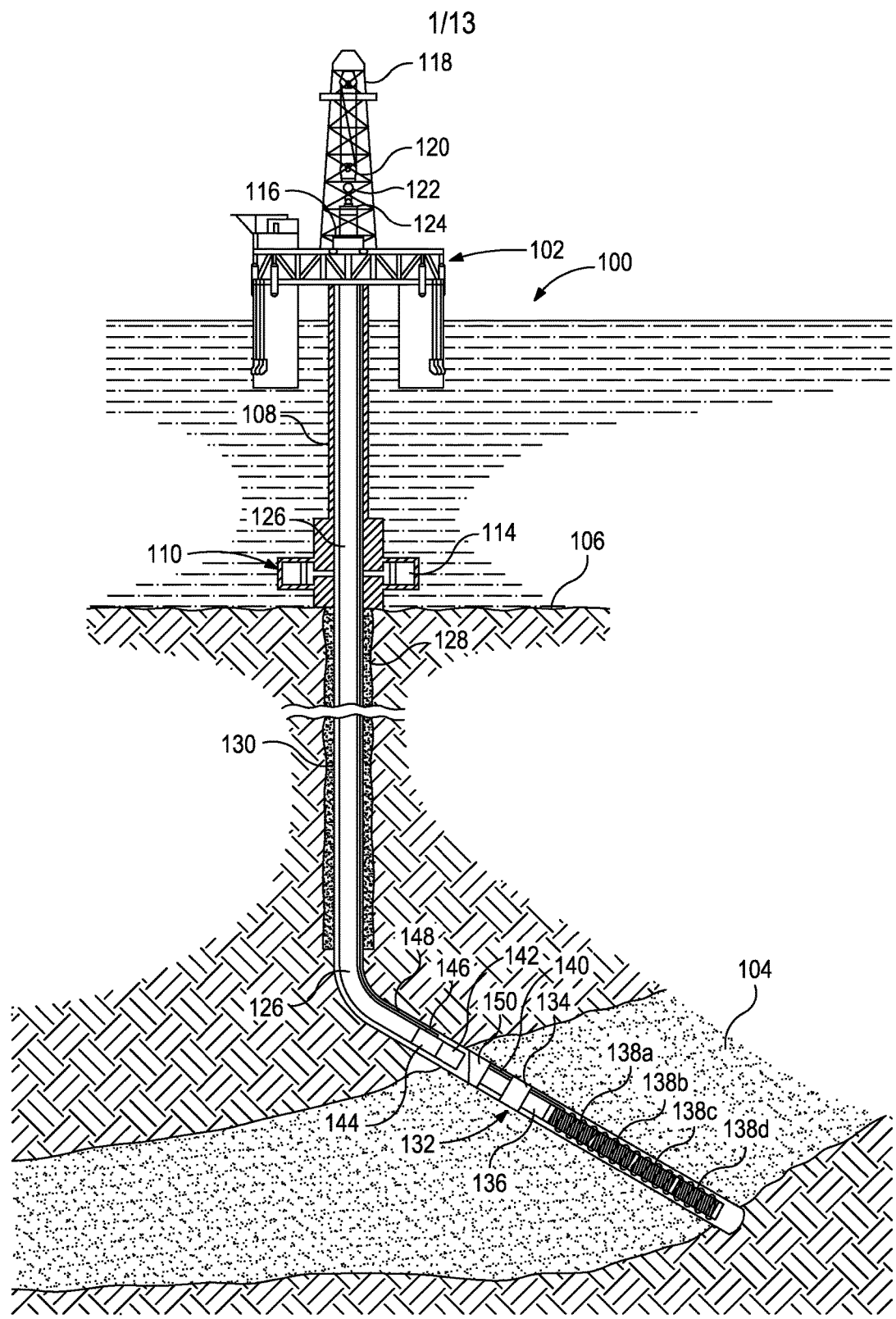
FIG. 1 illustrates a wellbore system that may employ the principles of the present disclosure, according to one or more embodiments.

Referring to FIG. 1, illustrated is a wellbore system 100 that may employ the principles of the present disclosure, according to one or more embodiments. As illustrated, the wellbore system 100 may include an offshore oil or gas platform 102 centered over a submerged oil and gas formation 104 located below the sea floor 106. A subsea riser or conduit 108 extends from the platform 102 to a wellhead installation 110 arranged at or on the sea floor 106. The wellhead installation may include one or more blowout preventers 114. The platform 102 includes a hoisting apparatus 116, a derrick 118, a travel block 120, a hook 122, and a swivel 124 for raising and lowering pipe strings, such as a production tubing 126, within the subsea conduit 108.

A wellbore 128 extends through the various earth strata below the sea floor 106, including the formation 104. An upper portion of wellbore 128 includes casing 130 that is cemented within the wellbore 128. Below the casing 130, the wellbore 128 is depicted as having deviated from vertical into an open hole portion. Disposed in the open hole portion of the wellbore 128 is a completion 132 that includes various tools such as a packer 134, a seal bore assembly 136, and one or more sand control screen assemblies, shown as screen assemblies 138a, 138b, 138c, and 138d.

A lower control line 140 may extend along the exterior of the completion 132. The lower control line 140 may be a spoolable metal conduit configured to house one or more communication media such as optical fibers, electrical conductors, hydraulic conduits, etc. In certain embodiments, the communication media may operate as energy conductors that facilitate power and/or data transmission between one or more downhole tools or sensors (not shown) and a surface location. In other embodiments, the communication media themselves may operate as downhole sensors, such as in the case of optical fibers in single mode or multi-mode.

For example, when optical fibers are used as the communication media, the optical fibers may be used to obtain distributed measurements representing a parameter along the entire length of the optical fiber, such as distributed temperature or seismic sensing. In operation, a pulse of laser light from the surface is sent along the optical fiber and portions of the light are backscattered to the surface due to the optical properties of the fiber. The slightly shifted frequency of the backscattered light provides information that may be used to determine the temperature or vibration at the point in the fiber where the backscatter originated. As the speed of light is constant, the distance from the surface to the point where the backscatter originated can also be readily determined. In this manner, continuous monitoring of the backscattered light will provide temperature and/or seismic profile information for the entire length of the optical fiber.

A variety of tools or devices may be disposed at the lower end of the string of production tubing 126, such as a seal assembly 142 and an anchor assembly 144. An upper control line connector 146 may be arranged on or otherwise attached to the anchor assembly 144. In some embodiments, the upper control line connector 146 (hereafter "the upper connector 146") may be a wet mate connector, but in other embodiments it may be a dry mate connector, without departing from the scope of the disclosure. Extending uphole from the upper connector 146 is an upper control line 148 that extends to the surface within the annulus between the production tubing 126 and the wellbore 128. The upper control line 148 may be coupled to the production tubing 126 at various locations to prevent damage to the upper control line 148 during installation.

Similar to the lower control line 140, the upper control line 148 may be a spoolable metal conduit configured to house one or more communication media such as optical fibers, electrical conductors, hydraulic conduits, etc. In some embodiments, the upper and lower control lines 148, 140 will have the same type of communication media disposed therein such that energy and/or signals may be transmitted therebetween following proper connection, as described herein.

In the illustrated embodiment, the completion 132 also includes a completion receptacle 150. The completion receptacle 150 may be configured to receive, orient, and align the production tubing 126. In some embodiments, the completion receptacle 150 may also include, provide, or otherwise house a lower control line connector (not shown), and the lower control line 140 may extend therefrom in the downhole direction and through the packer 134 so that it may be operably associated with the sand control screen assemblies 138a-d. The lower control line connector may be configured to be operatively coupled to the upper connector 146, thereby establishing a continuous connection between the upper and lower control lines 148, 140.

Prior to producing fluids from the formation 104, such as hydrocarbon fluids, the production tubing 126 and the completion 132 may be operatively and communicably coupled. When properly connected to each other, a sealed communication path is created between the seal assembly 142 and the seal bore assembly 136, which establishes a sealed internal flow passage from the completion 132 to the production tubing 126, thereby providing a fluid conduit to the surface for production fluids. In addition, as discussed in greater detail below, the present disclosure enables the communication media associated with the upper control line 148 to be operatively connected to the communication media associated with the lower control line 140, thereby enabling continuous communication therebetween. In the case of optical fibers, for instance, operatively coupling the upper control line 148 to the lower control line 140 may enable distributed temperature and/or seismic information along the completion 132 to be obtained and transmitted to the surface during any subsequent wellbore operations.

Even though FIG. 1 depicts a slanted wellbore, it should be understood by those skilled in the art that the control line connectors according to the present disclosure are equally well suited for use in wellbores having other orientations including vertical wellbores, horizontal wellbores, multilateral wellbores or the like. Accordingly, it should be understood by those skilled in the art that the use of directional terms such as above, below, upper, lower, upward, downward and the like are used in relation to the illustrative embodiments as they are depicted in the figures, the upward direction being toward the top of the corresponding figure and the downward direction being toward the bottom of the corresponding figure. Also, even though FIG. 1 depicts an offshore operation, it should be understood by those skilled in the art that the control line connectors according to the present disclosure are equally well suited for use in onshore operations. Further, even though FIG. 1 depicts an open hole completion, it should be understood by those skilled in the art that the control line connectors according to the present disclosure are equally well suited for use in cased hole completions.

Figure 2:
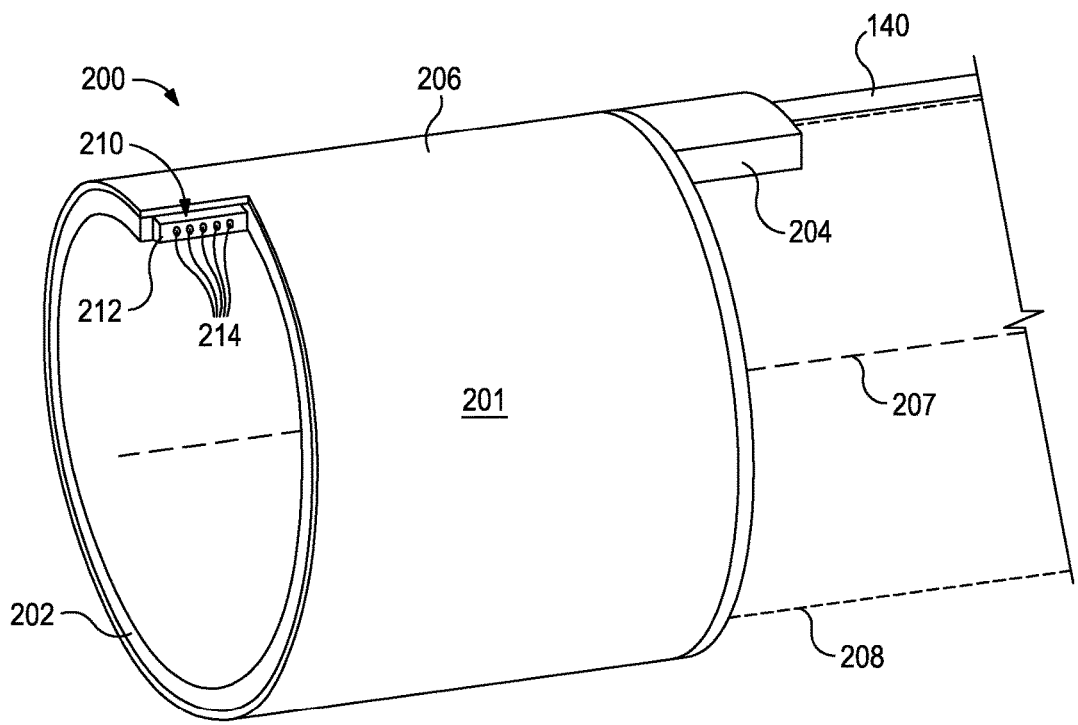
FIG. 2 illustrates an isometric view of an exemplary lower control line connector, according to one or more embodiments.

Referring now to FIG. 2, with continued reference to FIG. 1, illustrated is an isometric view of an exemplary lower control line connector 200, according to one or more embodiments. The lower control line connector 200 (hereafter "the lower connector 200") may be associated with the completion 132 of FIG. 1 and, in some embodiments, may be arranged within the completion receptacle 150 (FIG. 1), as discussed above. The lower connector 200 may be configured to be communicably and operatively coupled to the upper connector 146 (FIG. 1), which process is described in greater detail below. Once this connection is established, the communication media associated with the upper control line 148 (FIG. 1) may be communicably coupled to the communication media associated with the lower control line 140. As used herein, the phrase "communicably coupled" encompasses both direct and indirect couplings in order to transfer one or more of data, power, and control between the upper and lower control lines 148, 200. More particularly, communicably coupling the upper and lower control lines 148, 140 may entail a direct coupling of the communication media extending within each, but may also encompass an inductive coupling or resonant inductive coupling between the corresponding communication media. In such embodiments, the upper and lower connectors 146, 200 may be magnetically coupled (or otherwise) such that change in current flow through one wire induces a voltage across the end of another wire through electromagnetic induction.

While the terms "upper" and "lower" are used in conjunction with the upper connector 146 and the lower connector 200, respectively, those skilled in the art will readily appreciate that such directional terms are not to be considered limiting to the present disclosure, and are used only for reference and differentiation. Rather, the directional configurations of the upper connector 146 and the lower connector 200 may be reversed, without departing from the scope of the disclosure. In some embodiments, for instance, the upper connector 146 may alternatively be associated with the completion 132 or any other downhole tool or tool string, and the lower connector 200 may be coupled to the upper control line 148 and otherwise in direct communication with a surface location. Accordingly, since directional configuration is irrelevant, the upper and lower control line connectors 146, 200 may alternatively be characterized as first and second connectors, respectively, or vice versa.

As illustrated, the lower connector 200 may include a lower housing 201 that encompasses a body 202 and a shroud 206 that extends about the body 202. In some embodiments, the lower housing 201 (e.g., the body 202) may be generally cylindrical having a central axis 207 and otherwise configured to be disposed about a sub or tubular 208 (shown in dashed) that extends axially from the lower connector 200. In at least one embodiment, the tubular 208 may be associated with the completion 132 (FIG. 1) and may, for instance, extend to the packer 134 (FIG. 1) of the completion 132. In other embodiments, the tubular 208 may be associated with any other type of wellbore tubular or work string, without departing from the scope of the disclosure. Accordingly, as will be appreciated, use of the lower connector 200 is not limited to wellbore completion and production operations, but may equally be employed in any other wellbore operation or application, without departing from the scope of the disclosure. For instance, the lower connector 200 may also be used in conjunction with a test string or reservoir test tool lowered into the well to measure the reservoir size and properties. The lower connector 200 may also be used in well work over operations that involve gauges and test tools placed along a work string to measure reservoir, tubing, and annulus pressures during perforating and stimulating operations.

The shroud 206 may be configured to extend about the outer circumference of the body 202. In some embodiments, the shroud 206 may be configured to hermetically-seal the lower housing 201 so that wellbore fluids are substantially prevented from entering the lower connector 200 and otherwise contaminating the communication media disposed therein. The shroud 206 may be made of any rigid material including, but not limited to, metals, hard plastics, composite materials, and any combination thereof.

The lower connector 200 may also include a splitter block 204 coupled to the lower housing 201. More particularly, the splitter block 204 may be coupled or attached to one axial face or end of the body 202, and the lower control line 140 may be coupled to the opposing axial face of the splitter block 204 and extend axially therefrom. The splitter block 204 may be coupled to the lower housing 201 in a variety of ways including, but not limited to, welding, brazing, threading, mechanically-fastening (e.g., screws, pins, snap rings, etc.), adhesives, and any combination thereof. The lower control line 140 may be coupled to the splitter block 204 in a similar manner. As discussed below, the splitter block 204 may be configured to receive and separate (i.e., split) the various communication media disposed within the lower control line 140 and convey said communication media into the lower housing 201. Accordingly, the lower control line 140 may be considered to be operatively coupled to the lower housing 201 via the splitter block 204.

The lower connector 200 may further include a box connector 210. As described below, the box connector 210 may be configured to mate with a pin connector of the upper connector 146 (FIG. 1). The box connector 210 may be at least partially arranged within the lower housing 201 and include a box mating face 212 that protrudes a short distance out of the lower housing 201. The box mating face 212 may provide or otherwise define one or more holes 214 therein. As illustrated, the box connector 210 may be arranged with respect to the lower housing 201 such that the box mating face 212 generally faces a tangential direction or tangentially with respect to the curvature of the housing 201 and the body 202.

In some embodiments, for instance, the box mating face 212 may be linearly aligned or parallel with the central axis 207 and, therefore, face a truly tangential direction with respect to the housing 201. In other embodiments, however, the box mating face 212 may be slightly offset from parallel with the central axis 207 and, therefore, face a curvilinear direction with respect to the housing 201 and the body 202. As used herein, a component (e.g., the box mating face 212) that "faces tangentially" or faces in a "tangential direction," or any variation thereof, is meant to encompass a truly tangential alignment with another component (e.g., the housing 201), but also any offset alignment with said components, such as a curvilinear alignment, without departing from the scope of the disclosure.

The tangentially-oriented box connector 210 may prove advantageous and otherwise desirable over axially-oriented mating faces of conventional control line connectors. For instance, tangentially-orienting the box mating face 212 may reduce the potential for the accumulation of dirt, scale, and other wellbore debris on the box mating face 212, which could obstruct the holes 214 and potentially frustrate the connection of the lower connector 200 to the upper connector 146.

Figure 3:
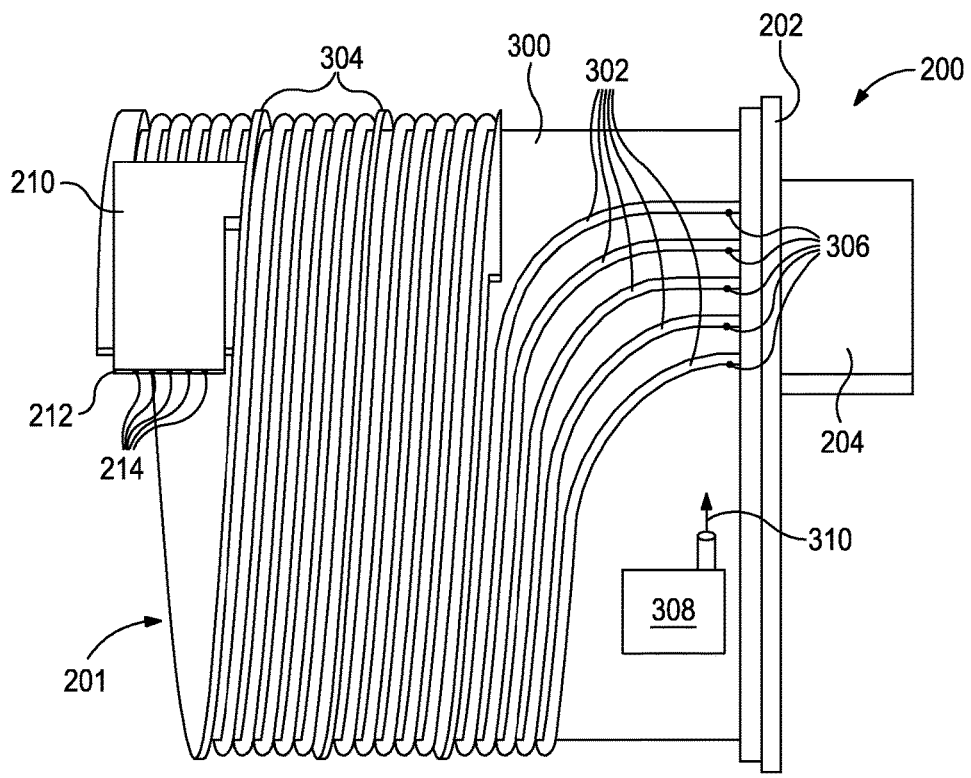
FIG. 3 illustrates an exposed side view of the lower control line connector of FIG. 2.

Referring now to FIG. 3, with continued reference to FIG. 2, illustrated is an exposed side view of the lower connector 200. More particularly, the shroud 206 (FIG. 2) has been removed in FIG. 3 to expose a conduit chamber 300 that may be defined within the lower housing 201 and otherwise between the body 202 and the shroud 206. As illustrated, one or more tubular conduits 302 may be arranged within the conduit chamber 300 and extend from the splitter block 204 to the box connector 210. The tubular conduits 302 may each be made of a semi-rigid, corrosion-resistant material such as, but not limited to, metals, plastics, composite materials, and any combination thereof. In at least one embodiment, one or more of the tubular conduits 302 may be made of a nickel steel alloy (e.g., INCOLOY® 825, 925, 945, and/or INCONEL® 718, G3) or a stainless steel alloy (e.g., stainless steel 316, 304, 410, and/or 440).

Each tubular conduit 302 may be configured to house a separate communication medium (e.g., an optical fiber, an electrical conductor, hydraulic fluid, etc.) and otherwise provide a passageway to convey the corresponding communication medium between the splitter block 204 and the box connector 210. Moreover, each tubular conduit 302 may be communicably and/or operatively coupled to the box connector 210 such that the corresponding communication media extending therein is able to extend into the box connector 210. For instance, in the case of optical fibers, the optical fiber within a given tubular conduit 302 may be configured to extend at least a short distance into the box connector 210 so as to ensure proper optical communication with an end of an opposing optical fiber.

The tubular conduits 302 generally serve to protect the communication media extending between the splitter block 204 and the box connector 210. In the illustrated embodiment, five tubular conduits 302 are depicted. Those skilled in the art will readily appreciate, however, that more or less than five tubular conduits 302 (including one) may be employed, without departing from the scope of the disclosure.

In some embodiments, the tubular conduits 302 may be helically wrapped around the body 202 between the splitter block 204 and the box connector 210. In some embodiments, the tubular conduits 302 may be wrapped around the body 202 once. In other embodiments, the tubular conduits 302 may be wrapped around the body 202 more than once, such as twice, three times, or more than three times. In yet other embodiments, the tubular conduits 302 may be wrapped around the body 202 less than a full revolution, such as a ¼ wrap or a ½ wrap around the body 202, without departing from the scope of the disclosure.

Especially in the case of optical fibers, winding the tubular conduits 302 about the body 202 may prove advantageous in reducing column loading on the optical fibers once the lower connector 200 is operatively and communicably coupled to the upper connector 146 (FIG. 1). More particularly, contacting the opposing ends of the optical fibers associated with the upper and lower control line connectors 146, 200 may place the optical fibers in axial compression. By wrapping the optical fiber helically around the body 202 (e.g., two, three, four or more revolutions) within the tubular conduits 302, more axial length of the optical fiber is available to assume any potential axial loads. As a result, the optical fiber may experience lower stress levels when properly connected and will therefore be less prone to breakage. Moreover, the inner diameter of the tubular conduits 302 may be greater than the diameter of an optical fiber. Such a loose fit of the optical fiber within the tubular conduits 302 may allow for some movement during mating to prevent high column loading on the optical fiber.

The body 202 may further define or otherwise provide one or more ribs 304 that protrude radially from the outer surface of the body 202 and into the conduit chamber 300. In some embodiments, the shroud 206 (FIG. 2) may be configured to seat against or otherwise be coupled to the ribs 304. Accordingly, the ribs 304 may provide radial support for the shroud 206, and otherwise protect the tubular conduits 302 from compression damage. In the illustrated embodiment, the ribs 304 are depicted as a continuous spiraling length that proceeds helically around the body 202. A corresponding helical passageway may be defined between axially adjacent portions of the spiraling rib 304, and the tubular conduits 302 may be able to extend within the helical passageway. Those skilled in the art will readily appreciate the several different variations of ribs 304 may be employed to accomplish the same ends of radially supporting the shroud 206 and simultaneously protecting the tubular conduits 302 from compression damage. For instance, in some embodiments, the spiraling rib 304 need not be a continuous length but may alternatively encompass two or more spiraled sections.

In some embodiments, the conduit chamber 300 may be filled with an optical gel (not shown) useful in protecting optical fibers that may be disposed within one or more of the tubular conduits 302 from well fluid contamination. In at least one embodiment, as illustrated, one or more of the tubular conduits 302 may provide or otherwise define a gel inlet 306 that allows the optical gel to flow into the corresponding tubular conduit 302 and to the box connector 210. More particularly, upon mating with the pin connector (not shown) of the upper connector 146 (FIG. 1), the box connector 210 may be configured to move a short distance into the lower housing 201 (e.g., the conduit chamber 300). In the illustrated embodiment of FIG. 3, the box connector 210 is depicted in an extended configuration, where the box mating face 212 extends a short distance out of the lower housing 201. When properly mated to the pin connector, however, the box connector 210 may be moved further into the lower housing 201 until assuming a retracted configuration (shown in FIG. 6 below).

Movement of the box connector 210 to the retracted configuration increases the fluid pressure within the conduit chamber 300, which may hydraulically force optical gel to flow into the tubular conduits 302 via corresponding gel inlets 306. The box connector 210 may be spring loaded and otherwise biased to maintain the box connector 210 in its extended configuration. Accordingly, upon disconnecting the box connector 210 from the pin connector, the box connector 210 may be configured to autonomously return to the extended configuration. Moving back to the extended configuration, however, may generate a pressure differential between the conduit chamber 300 and the exterior of the lower housing 201. Unless alleviated, this pressure differential could draw in sand, scale or other wellbore debris into the conduit chamber 300.

In order to alleviate the generated pressure differential, in at least one embodiment, the lower connector 200 may further include a gel reservoir 308 configured to inject or otherwise provide additional optical gel into the conduit chamber 300 upon disconnecting the box connector 210. In some embodiments, as illustrated, the gel reservoir 308 may be arranged within the conduit chamber 300. In other embodiments, however, the gel reservoir 308 may be arranged outside of the lower housing 201, but nonetheless in fluid communication with the conduit chamber 300. The gel reservoir 308 may include a fluid actuator (not shown), such as a piston or a bladder, housed within the gel reservoir 308 and configured to autonomously pump additional optical gel 310 into the conduit chamber 300 upon sensing the pressure differential caused by the disconnection of the box connector 210. Actuation of the fluid actuator may be configured to compensate for the loss of the optical gel into the tubular conduits 302 when the box connector 210 moves back to the extended position. Accordingly, every time the box connector 210 is pumped (i.e., moved between extended and retracted configurations), the fluid actuator may be configured to correspondingly move and provide additional optical gel 310 to the conduit chamber 300 to compensate for the optical gel that previously flowed into the tubular conduits 302.

Figure 4A:
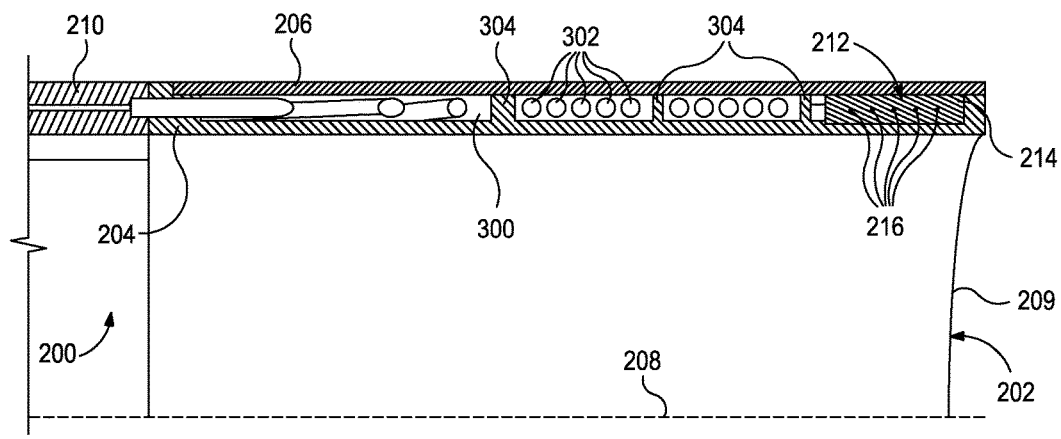
FIG. 4A illustrates a partial side cross-sectional view of the lower control line connector of FIG. 2, according to one or more embodiments.
Figure 4B:
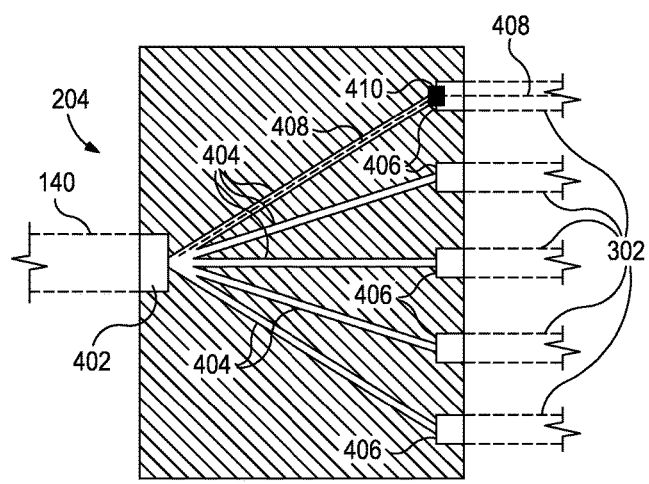
FIG. 4B illustrates a planar cross-sectional view of the splitter block of FIGS. 2 and 3, according to one or more embodiments.

Referring now to FIGS. 4A and 4B, with continued reference to FIGS. 2 and 3, illustrated are cross-sectional views of the lower connector 200 and the splitter block 204, respectively, according to one or more embodiments. More particularly, FIG. 4A depicts a partial side cross-sectional view of the lower housing 201 and the splitter block 204 of the lower connector 200, and FIG. 4B depicts a planar cross-sectional view of the splitter block 204.

As depicted in FIG. 4A, the shroud 206 may be operatively coupled to the body 202 in order to define the conduit chamber 300 therebetween. The ribs 304 are also depicted as providing radial support to the shroud 206 and otherwise forming a passageway within the conduit chamber 300. As mentioned above, the tubular conduits 302 may be configured to extend between the splitter block 204 and the box connector 210 within the passageway(s) formed by the ribs 304. The shroud 206 may be coupled to the body 202 (and/or the ribs 304) in a variety of ways including, but not limited to, welding, brazing, threading, mechanically-fastening (e.g., screws, pins, snap rings, etc.), adhesives, and any combination thereof. As can be seen in FIG. 4A, the lower connector 200 maintains a low profile (i.e., relatively small radial thickness), which may prove advantageous in downhole applications where radial space is limited.

Referring to FIG. 4B, the splitter block 204 may include or otherwise define a control line port 402 configured to receive and seat the lower control line 140 (shown in dashed). The splitter block 204 may further define or otherwise provide one or more communication media pathways 404 that extend from the control line port 402. The communication media pathways 404 may be drilled into the splitter block 204 or otherwise integrally formed therein during manufacturing (i.e., molds, castings, etc.). Each communication media pathway 404 may be configured to receive and convey a separate communication medium (e.g., an optical fiber, an electrical conductor, hydraulic fluid, etc.) to a corresponding tubular conduit port 406. Each tubular conduit port 406 may be configured to receive and seat a corresponding one of the tubular conduits 302. The tubular conduits 302 may be operatively coupled to a given tubular conduit port 406 via a variety of ways including, but not limited to, welding, brazing, threading, mechanically-fastening (e.g., screws, pins, snap rings, etc.), adhesives, and any combination thereof.

In embodiments where an optical fiber constitutes the communication medium run through a given communication media pathway 404, a pressure seal may be made on the optical fiber to prevent wellbore fluids from entering the given communication media pathway 404. More particularly, an optical fiber 408 is depicted in FIG. 4B as extending within one of the communication media pathways 404. At or near the corresponding tubular conduit port 406, a pressure seal 410 may be generated. The pressure seal 410, for example, may be a glass bead fused to the optical fiber 408 and otherwise sealed into the splitter block 204 to provide a pressure seal capable of withstanding wellbore pressures and any fluid pressure within the upper and lower control lines 148, 140 (FIG. 1).

Figure 5:
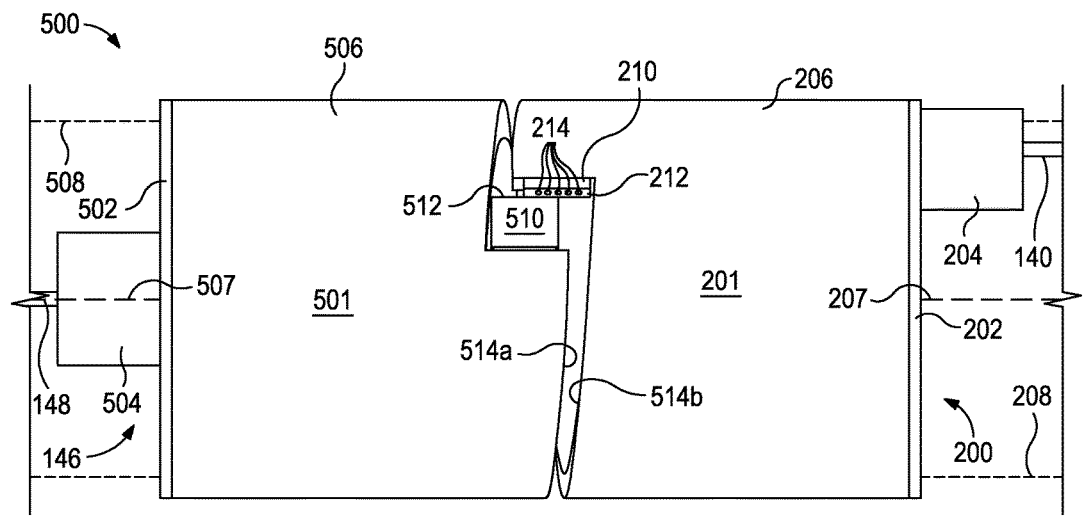
FIG. 5 illustrates a side view of a control line connector assembly, according to one or more embodiments.

Referring now to FIG. 5, with continued reference to FIGS. 1-3, illustrated is a side view of an exemplary control line connector assembly 500, according to one or more embodiments. As illustrated, the control line connector assembly 500 (hereafter "the assembly 500") may include the upper connector 146 and the lower connector 200. The upper connector 146 may be similar in some respects to the lower connector 200, and therefore may be best understood with reference thereto. For instance, similar to the lower connector 200, the upper connector 146 may include an upper housing 501 that may encompass a body 502 and a shroud 506 that extends about the body 502. The upper housing 501 may be generally cylindrical having a central axis 507 and otherwise configured to be disposed about a sub or tubular 508 (shown in dashed) that extends axially from the upper connector 146. In at least one embodiment, the tubular 508 may be a production tubular, such as the production tubing 126 of FIG. 1. In other embodiments, the tubular 508 may be associated with any other type of wellbore tubular or work string, without departing from the scope of the disclosure.

The upper control line connector assembly 500 may also include a splitter block 504 that may be coupled or attached to one axial face or end of the upper housing 501, and the upper control line 148 may be coupled to the opposing axial face of the splitter block 504 and extend axially therefrom. The splitter block 504 may be coupled to the upper housing 501 (e.g., the body 502) in a variety of ways including, but not limited to, welding, brazing, threading, mechanically-fastening (e.g., screws, pins, snap rings, etc.), adhesives, and any combination thereof. The upper control line 148 may be coupled to the splitter block 504 in a similar manner. Similar to the splitter block 204 of the lower connector 200, the splitter block 504 may be configured to receive and separate (i.e., split) the various communication media disposed within the upper control line 148 and convey the communication media into the upper housing 501. Accordingly, the upper control line 148 may be considered to be operatively coupled to the upper housing 501 via the splitter block 504.

The shroud 506 may be configured to extend about the outer circumference of the body 502. In some embodiments, the shroud 506 may be configured to hermetically-seal the upper housing 501 so that wellbore fluids are substantially prevented from entering the upper connector 146 and otherwise damaging the communication media disposed therein. The shroud 506 may be made of any rigid material including, but not limited to, metals, hard plastics, composite materials, and any combination thereof.

The upper connector 146 may further include a pin connector 510 configured to mate with the box connector 210 of the lower connector 200. The pin connector 510 may include or otherwise define a pin mating face 512. Similar to the box mating face 212 of the box connector 210, the pin connector 510 may be arranged with respect to the upper housing 501 such that the pin mating face 512 generally faces a tangential direction or is tangentially-oriented with respect to the curvature of the upper housing 501 and the body 502. For instance, the pin mating face 512 may be linearly aligned or parallel with the central axis 507 and, therefore, face a truly tangential direction with respect to the upper housing 501. In other embodiments, however, the pin mating face 512 may be slightly offset from parallel with the central axis 507 and, therefore, face in a curvilinear direction with respect to the upper housing 501 and the body 502. As described below, the pin mating face 512 may be configured to be angularly aligned with and engage the box mating face 212 of the box connector 210 during coupling of the upper and lower control line connectors 146, 200. Accordingly, during mating of the upper and lower control line connectors 146, 200, the central axes 507, 207 of the upper and lower housings 501, 201, respectively, may be substantially coaxial.

The upper housing 501 may further include an upper axial mating face 514a configured to engage a lower axial mating face 514b of the lower housing 201 during coupling of the upper and lower control line connectors 146, 200. As illustrated, the upper and lower axial mating faces 514a,b may be angled or otherwise complementarily spiraled such that they may be helically-aligned similar to the engagement of mechanical threads. One or more grooves, slots, castellations, or other similar structural features (not shown) may be defined on one or both of the upper and lower axial mating faces 514a,b and may be configured to channel or otherwise move debris away from the upper and lower axial mating faces 514a,b during mating. Such grooves or slots may prove advantageous in removing debris that may otherwise frustrate proper coupling of the upper and lower control line connectors 146, 200.

To establish a connection between the upper and lower control line connectors 146, 200, the upper and lower axial mating faces 514a,b may first be brought into axial engagement. This may be accomplished by moving one or both of the upper and lower control line connectors 146, 200 in the axial direction until the upper axial mating face 514a engages the lower axial mating face 514b. Once the upper and lower axial mating faces 514a,b are axially engaged, one or both of the upper and lower control line connectors 146, 200 may be angularly rotated with respect to each other in order to bring the pin mating face 512 into angular engagement with the box mating face 212. The angle or curvature of each axial mating face 514a,b allows the upper and lower control line connectors 146, 200 to be aligned axially and rotated until the box mating face 212 is rotationally engaged with the pin mating face 512.

The assembly 500 may prove advantageous in having the box and pin mating faces 212, 512 arranged away from the axial direction where sand, scale, and other wellbore debris may otherwise obstruct proper connection between the upper and lower control line connectors 146, 200. Rather, the box and pin mating faces 212, 512 of the assembly 500 are configured to be angularly aligned and subsequently mated with angular rotation instead of axial translation. As discussed in more detail below, further angular rotation of one or both of the upper and lower control line connectors 146, 200 may serve to establish a connection between the communication media of the upper and lower control lines 148, 140.

In some embodiments, angular rotation of one or both of the upper and lower control line connectors 146, 200 may be accomplished by manually rotating one or both of the upper and lower control line connectors 146, 200. This may be done, for example, by rig hands on a rig floor or otherwise prior to introducing the assembly 500 into the downhole environment. In other embodiments, angular rotation of one or both of the upper and lower control line connectors 146, 200 may be accomplished by rotating the upper connector 146 as connected to the tubular 508 (e.g., the production tubing 126 of FIG. 1). This may be done, for example, by rotating the tubular 508 from a surface location. In yet other embodiments, angular rotation of one or both of the upper and lower control line connectors 146, 200 may be accomplished by allowing gravitational forces to act on the angled axial mating faces 514a,b. More particularly, the angle of the axial mating faces 514a,b may allow axial loading assumed by the upper and lower control line connectors 146, 200 to be converted into angular rotation of the upper and lower control line connectors 146, 200 as the axial mating faces 514a,b slidingly engage each other.

Figure 6:
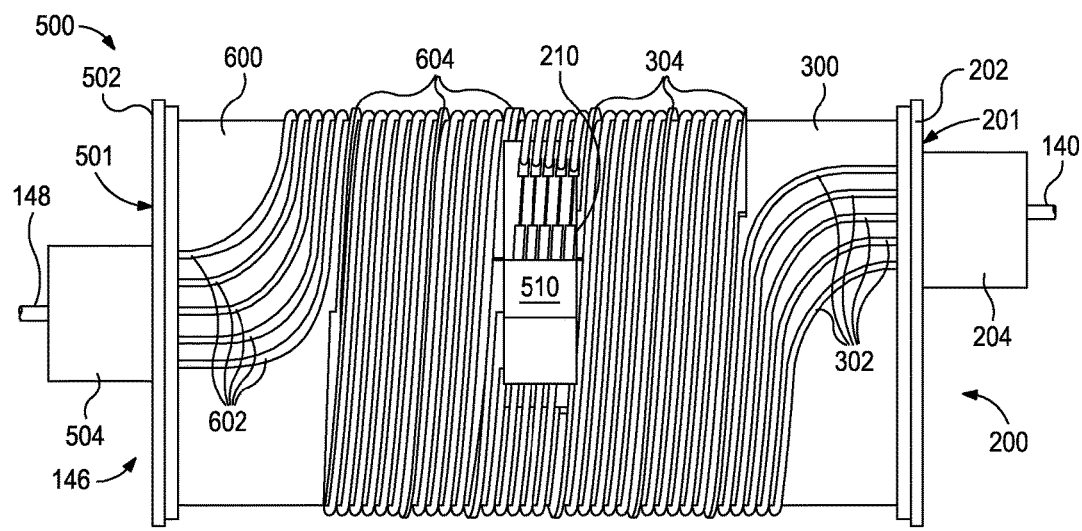
FIG. 6 illustrates an exposed side view of the control line connector assembly of FIG. 5.

Referring now to FIG. 6, with continued reference to FIG. 5, illustrated is an exposed side view of the assembly 500. The assembly 500 is depicted in a coupled configuration, where the upper and lower control line connectors 146, 200 have been successfully mated. The shrouds 206, 506 (FIG.

5) have been removed in FIG. 6 to expose the conduit chamber 300 defined within the lower housing 201 and a conduit chamber 600 defined within the upper housing 501. Similar to the conduit chamber 300 of FIG. 3, the conduit chamber 600 may be defined between the body 502 and the shroud 506 of the upper housing 501.

Moreover, one or more tubular conduits 602 may be arranged within the conduit chamber 600 and extend from the splitter block 504 to the pin connector 510. The tubular conduits 602 may be similar to the tubular conduits 302 of the lower connector 200. For instance, each tubular conduit 602 may be configured to house a separate communication medium (e.g., an optical fiber, an electrical conductor, hydraulic fluid, etc.) and otherwise provide a passageway to convey the corresponding communication medium between the splitter block 504 and the pin connector 510.

Moreover, in some embodiments, the tubular conduits 602 may be helically wrapped around the body 502 between the splitter block 504 and the pin connector 510. In some embodiments, the tubular conduits 602 may be wrapped around the body 502 once. In other embodiments, the tubular conduits 602 may be wrapped around the body 502 more than once, such as twice, three times, or more than three times. In yet other embodiments, the tubular conduits 602 may be wrapped around the body 502 less than a full revolution, such as a ¼ wrap or a ½ wrap around the body 502, without departing from the scope of the disclosure.

The number of tubular conduits 602 disposed in the conduit chamber 600 may match the number of tubular conduits 302 disposed in the conduit chamber 300, such that the communication media from the lower control line 140 may be appropriately coupled to the communication media from the upper control line 148. Those skilled in the art will readily appreciate, however, that more or less than five tubular conduits 602 (including one) may be employed, without departing from the scope of the disclosure. The tubular conduits 602 may each be communicably and operatively coupled to the splitter block 504, which allows the communication media from the upper control line 148 to be separated and extend into corresponding tubular conduits 602. The splitter block 504 may be similar to the splitter block 204 described above with reference to FIGS. 2 and 4B, and therefore will not be described again in detail.

The upper housing 501 may further define or otherwise provide one or more ribs 604 that protrude radially from the outer surface of the body 502 and into the conduit chamber 600. The ribs 604 may be similar to the ribs 304 of the lower connector 200. For instance, the ribs 604 may encompass a continuous spiraling length that proceeds helically around the body 502, and a corresponding helical passageway may be defined between axially adjacent portions of the spiraling rib 604 where the tubular conduits 602 may be able to extend. Moreover, the shroud 506 (FIG. 5) may be configured to seat against or otherwise be coupled to the ribs 604, which may provide radial support for the shroud 506 and otherwise protect the tubular conduits 602 from compression damage.

Figure 7A:
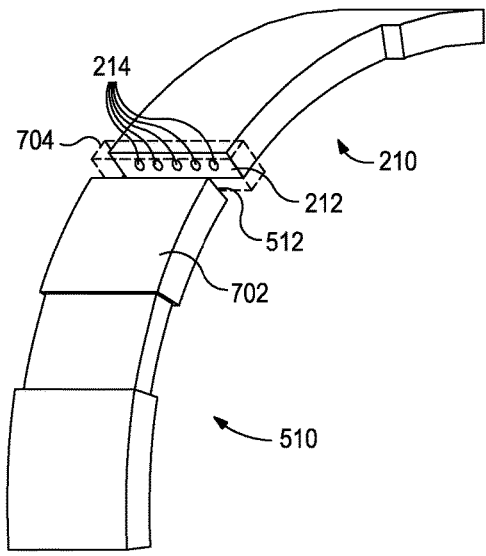
FIGS. 7A and 7B illustrate isometric views of the box connector and the pin connector of FIGS. 5 and 6, according to one or more embodiments.
Figure 7B:
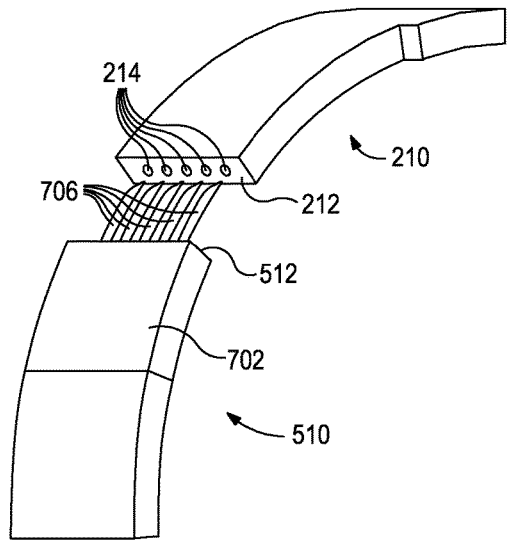

Referring now to FIGS. 7A and 7B, with continued reference to FIGS. 5 and 6, illustrated are cross-sectional isometric views of the box connector 210 and the pin connector 510, according to one or more embodiments. More particularly, the box connector 210 and the pin connector 510 are depicted in tangential (or curvilinear) alignment and otherwise prepared to be mated in accordance with the present disclosure. The remaining portions of the upper and lower control line connectors 146, 200 are omitted for clarity.

As illustrated, the pin connector 510 may include a retractable cover 702 that is movable between an extended configuration, as shown in FIG. 7A, and a retracted configuration, as shown in FIG. 7B. In some embodiments, the retractable cover 702 may be spring biased and otherwise naturally biased to the extended configuration. In other embodiments, the retractable cover 702 may be pinned or otherwise secured in the extended configuration with one or more shearable devices (not shown), such as one or more shear pins or rings. In order to move the retractable cover 702 to the retracted configuration, an axial load may be applied on the retractable cover 702 until the associated shearable device fails.

The pin mating face 512 may be defined on the end of the retractable cover 702 and otherwise configured to engage the box mating face 212 of the box connector 210. In some embodiments, the box mating face 212 may be sealed in order to protect the one or more holes 214 defined in the box connector 210 from the inadvertent influx of sand, scale, and/or other wellbore debris. In one embodiment, the box connector 210 may include a lid 704 (shown in dashed) that may be used to seal the box mating face 212. While shown in FIG. 7A as extending about the end of the box connector 210, the lid 704 may equally be a plate secured to the box mating face 212, without departing from the scope of the disclosure. In other embodiments, box mating face 212 may be sealed by arranging a plug within each hole 214. Similar to the function of the lid 704, the plugs may be configured to prevent the inadvertent influx of wellbore debris into the holes 214. In yet other embodiments, a combination of both the lid 704 and plugs disposed in the holes 214 may be used, without departing from the scope of the disclosure. The sealing properties of the lid 704 or plugs may be characterized as a sealing interface on the box mating face 212.

Referring to FIG. 7B, the pin connector 510 may further include one or more hypodermic tubes 706 that extend from the pin connector 510. Each hypodermic tube 706 may be a needle-like structure that defines a central passageway that facilitates the conveyance of communication media (e.g., optical fiber) therethrough. As illustrated, when the retractable cover 702 is in its extended configuration (FIG. 7A), the hypodermic tubes 706 may be generally housed within the retractable cover 702. While moving the retractable cover 702 to its retracted configuration (FIG. 7B), however, the hypodermic tubes 706 may be configured to penetrate the pin mating face 512 and thereby extend out of the retractable cover 702. Accordingly, at least the pin mating face 512 of the retractable cover 702 may be made of a semi-rigid material, such as rubber, that may be able to be penetrated by the hypodermic tubes 706. Moreover, the hypodermic tubes 706 may be made of a material that is rigid enough to penetrate the material of the pin mating face 512, such as a metal or a plastic.

In FIG. 7B, the retractable cover 702 is depicted in its retracted configuration and the lid 704 is omitted for convenience in viewing the hypodermic tubes 706. In exemplary operation, however, the retractable cover 702 may be moved from the extended configuration to the retracted configuration through engagement between the pin mating face 512 and the box mating face 212. More particularly, and with brief reference again to FIG. 5, once the upper and lower axial mating faces 514a,b are axially engaged, one or both of the upper and lower control line connectors 146, 200 may be angularly rotated with respect to each other. Rotating the upper and lower control line connectors 146, 200 may bring the pin mating face 512 into angular alignment and engagement with the box mating face 212. Further angular rotation of one or both of the upper and lower control line connectors 146, 200 may overcome the spring force of the retractable cover 702 (or otherwise shear any shearable devices used to secure the retractable cover 702 in place) and begin to move the retractable cover 702 from its extended configuration to its retracted configuration. As the retractable cover 702 is moved to the retracted configuration, the hypodermic tubes 706 may penetrate and otherwise extend through the pin mating face 512.

During this process, and as the retractable cover 702 moves to the retracted configuration, the pin mating face 512 remains in contact with the box mating face 212. After penetrating the pin mating face 512, continued angular rotation of one or both of the upper and lower control line connectors 146, 200 may force the hypodermic tubes 706 into the corresponding holes 214 defined on the box connector 210. In the event the box connector 210 further utilizes the lid 704 (FIG. 7A), or plugs disposed within the holes 214, the hypodermic tubes 706 may further be configured to penetrate such structures. Accordingly, the lid 704 and the plugs may also be made of a semi-rigid material, such as rubber, that may be penetrated by the hypodermic tubes 706.

After penetrating the lid 704 (or plugs in the holes 214), the hypodermic tubes 706 may proceed to extend into the box connector 210, and thereby provide a conduit from the pin connector 510 to the box connector 210 for the introduction and/or coupling of communication media. As will be appreciated, the hypodermic tubes 706 may prove advantageous in preventing debris from fouling the connection between the box and pin connectors 210, 510. More particularly, wellbore debris (e.g., sand, particulates, metal shavings, scale, etc.) may interpose the angular engagement between the pin mating face 512 and the box mating face 212. Having the hypodermic tubes 706 penetrate the pin and box mating faces 512, 212 may serve to wipe the hypodermic tubes 706 clean from such wellbore debris such that an unobstructed communication media connection may be achieved within the box connector 510. Moreover, the hypodermic tubes 706 are able to bypass the wellbore debris trapped between the box and pin mating faces 212, 512 without obstructing the coupling of the communication media.

In some embodiments, during the above-described mating process, the box and pin connectors 210, 510 may be ultimately secured together using a type of hydraulic quick coupling. For instance, in at least one embodiment, a portion of the pin connector 510 may be configured to extend a short distance over the box connector 210 as the upper and lower control line connectors 146, 200 are angularly rotated with respect to each other. The resulting hydraulic quick coupling engagement may be manually disconnected upon returning to the surface.

Figure 8A:
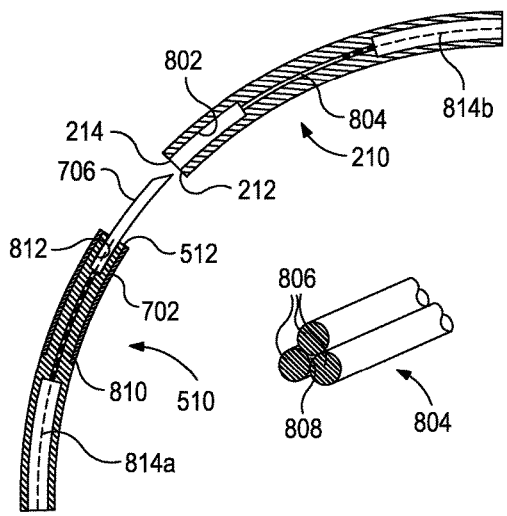
FIGS. 8A and 8B illustrate cross-sectional side views of the box connector and the pin connector of FIGS. 5 and 6, according to one or more embodiments.
Figure 8B:
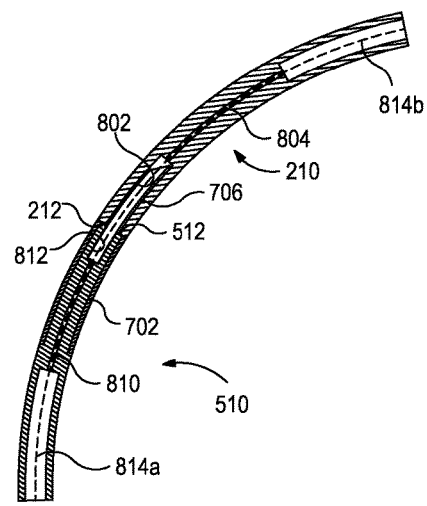

Referring now to FIGS. 8A and 8B, with continued reference to FIGS. 7A-7B, illustrated are cross-sectional side views of the box connector 210 and the pin connector 510, according to one or more embodiments. More particularly, FIG. 8A depicts the box connector 210 and the pin connector 510 in a separated configuration, and FIG. 8B depicts the box connector 210 and the pin connector 510 in a mated configuration. Similar to FIG. 7B, the retractable cover 702 in FIG. 8A is depicted in its retracted configuration, but would otherwise be moved to the retracted configuration upon engagement with the box mating face 212. Moreover, the lid 704 (FIG. 7A) is also omitted, but could otherwise be included to seal the box mating face 212.

As illustrated, the box connector 210 may further include a needle guide 802 and an alignment feature 804. During mating, the needle guide 802 may be configured to receive and align the one or more hypodermic tubes 706 with the alignment feature 804. In FIG. 8B, the hypodermic tube 706 is depicted as being received within the needle guide 802. As will be appreciated, the number of needle guides 802 defined in the box connector 210 may equal the number of hypodermic tubes 706. In the embodiment shown in FIGS. 7A and 7B, for instance, the box connector 210 would include five needle guides 802 in order to accommodate the five hypodermic tubes 706. Embodiments are contemplated herein, however, where the pin connector 510 includes more or less than five hypodermic tubes 706 (including one), therefore necessitating a corresponding more or less than five needle guides 802 in the box connector 210, without departing from the scope of the disclosure.

The alignment feature 804 may extend from or otherwise communicate with the needle guide 802 within the box connector 210. Accordingly, the number of alignment features 804 provided in the box connector 210 may be equal to the number of needle guides 802. Each alignment feature 804 may be configured to align a corresponding communication media (e.g., optical fiber, electrical conductor, hydraulic fluid, etc.) extending from the pin connector 510 with the communication media extending from the box connector 210. In some embodiments, the box connector 210 may encompass two halves that can be mated together, and the alignment feature 804 may be a milled, cast, or molded channel defined in the opposing halves. The channel may assume an arcuate shape that accommodates the curvature of the box connector 210. Moreover, in at least one embodiment, the diameter or size of the channel may be designed so as to accommodate a single optical fiber. For instance, the diameter of the channel may be about 0.010 inches.

In other embodiments, however, the alignment feature 804 may be made of or defined by a set of elongate geometric shapes disposed within or otherwise forming an integral part of the box connector 210. For instance, as depicted in the inset graphic in FIG. 8A, the alignment feature 804 may encompass at least three cylinders or rods 806 that may be tightly packed together so as to define an elongate gap 808 therebetween. Similar to the dimensions of the channel discussed above, the size of the resulting elongate gap 808 may be large enough and otherwise designed to accommodate the thickness of a single optical fiber (e.g., about 0.010 inches). Moreover, in order to accommodate the curvature of the box connector 210, the rods 806 may be bent or arcuate in shape.

As illustrated, the pin connector 510 may further provide or otherwise define one or more communication paths 810 that lead to a corresponding one or more conduit seats 812. Each conduit seat 812 (one shown) may be configured to receive and seat a corresponding hypodermic tube 706. Accordingly, the number of conduit seats 812 provided in the pin connector 510 may be equal to the number of hypodermic tubes 706 employed. The communication paths 810 may be configured to convey the communication media (e.g., optical fiber, electrical conductor, hydraulic fluid, etc.) into the corresponding hypodermic tubes 706.

An exemplary process or method of mating the box connector 210 and the pin connector 510 is now provided. Successfully mating the box and pin connectors 210, 510 may result in the successful mating of communication media (e.g., optical fibers, electrical conductors, hydraulic fluids or conduits, etc.) extending between the box and pin connectors 210, 510. In the embodiment depicted in FIGS. 8A and 8B, a continuous optical fiber is to be generated by mating the box and pin connectors 210, 510. More particularly, an upper optical fiber 814a is depicted as extending within the pin connector 510 and at least partially into the hypodermic tube 706. In at least one embodiment, the upper optical fiber 814a may originate from the upper control line 148 (FIGS. 5 and 6) as extended through the splitter block 504 (FIGS. 5 and 6) and corresponding one of the tubular conduits 602 (FIGS. 5 and 6). A lower optical fiber 814b is also depicted as extending within the box connector 210 and at least partially into the alignment feature 804. In at least one embodiment, the lower optical fiber 814b may originate from the lower control line 140 (FIGS. 5 and 6) as extended through the splitter block 204 (FIGS. 5 and 6) and corresponding one of the tubular conduits 302 (FIGS. 5 and 6).

In FIG. 8A, the retractable cover 702 is again depicted in its retracted configuration, but would otherwise be moved from the extended configuration to the retracted configuration via engagement between the pin mating face 512 and the box mating face 212. Once the pin mating face 512 is brought into angular alignment and engagement with the box mating face 212, as generally described above, further angular rotation of one or both of the upper and lower control line connectors 146, 200 (FIGS. 5 and 6) may commence moving the retractable cover 702 from its extended configuration to its retracted configuration. In some embodiments, as discussed above, the angular rotation may overcome the spring force of the retractable cover 702. In other embodiments, however, the angular rotation may serve to shear the shearable device(s) used to secure the retractable cover 702 in place. As the retractable cover 702 is moved to the retracted configuration, the hypodermic tubes 706 may be forced to penetrate and otherwise extend through the pin mating face 512.

In FIG. 8B, after penetrating the pin mating face 512, continued angular rotation of one or both of the upper and lower control line connectors 146, 200 (FIGS. 5 and 6) may force the hypodermic tubes 706 into the corresponding holes 214 and needle guides 802 defined in the box connector 210. Once extended into the needle guides 802, the hypodermic tubes 706 may facilitate a continuous conduit that extends from the pin connector 510 to the box connector 210 in order to optically communicate the upper and lower optical fibers 814a,b. Further angular rotation of one or both of the upper and lower control line connectors 146, 200 (FIGS. 5 and 6) may allow the upper and lower optical fibers 814a,b to telescope toward each other within the alignment feature 804.

More particularly, added angular rotation by one or both of the upper and lower control line connectors 146, 200 (FIGS. 5 and 6) may force or move the pin connector 510 back into the upper housing 501 (FIG. 6) of the upper connector 146 a short distance. Such movement of the pin connector 510 may allow the upper optical fiber 814a to telescope or extend out of the corresponding hypodermic tube 706, through the needle guide 802 of the box connector 210 and into the alignment feature 804. Likewise, added angular rotation by one or both of the upper and lower control line connectors 146, 200 may also force or move the box connector 210 back into the lower housing 201 (FIGS. 2, 3, 5, and 6) of the lower connector 200 a short distance. Such movement of the box connector 210 may allow the lower optical fiber 814b to extend further into the alignment feature 804 and into optical communication with the upper optical fiber 814a. Accordingly, during the mating process, the upper and lower optical fibers 814a,b may be configured to remain stationary while the pin and box connectors 510, 210 move further into their respective housings 501, 201. Moreover, as discussed above, movement of the box connector 210 may also pump optical gel into the corresponding tubular conduits 302 (FIGS. 3 and 6) and subsequently into the box connector 210.

In some embodiments, the upper and lower optical fibers 814a,b may be moved into contact with each other within the alignment feature 804. As discussed above, contacting the upper and lower optical fibers 814a,b may place the optical fibers 814a,b in axial compression. However, since the upper and lower optical fibers 814a,b may be helically wrapped around their respective bodies 502, 202 within corresponding tubular conduits 602, 302, more axial length of the optical fibers 814a,b is available to assume any potential axial loads. As a result, the upper and lower optical fibers 814a,b may experience lower stress levels when properly connected.

In other embodiments, however, the upper and lower optical fibers 814a,b may be in optical communication with each other within the alignment feature 804, but not into physical contact with each other. In such embodiments, the inner wall of the alignment feature 804 may be cladded or otherwise configured to provide total internal reflection between the upper and lower optical fibers 814a,b. As a result, optical communication between the upper and lower optical fibers 814a,b may nonetheless be achieved.

To disconnect or de-mate the box and pin connectors 210, 510 the above-described process can be reversed, including rotating one or both of the upper and lower control line connectors 146, 200 (FIGS. 5 and 6) in a direction opposite the direction used to mate the upper and lower control line connectors 146, 200. As angularly rotated in the opposing direction, the retractable cover 702 begins to move back into the extended configuration (FIG. 7A) and the hypodermic tubes 706 are drawn out of the holes 714. In some embodiments, the holes may be configured to autonomously close or seal as the hypodermic tubes 706 are drawn out in order to prevent the influx of wellbore debris into the box connector 210. Moreover, as the retractable cover 702 moves back to the extended configuration, the hypodermic tubes 706 may also be retracted back into the retractable cover 702. During this process, in at least one embodiment, the retractable cover 702 may be configured to wipe and clean the surface of the hypodermic tubes 706 so as to remove any wellbore debris that may have contaminated the hypodermic tubes.

Referring now to FIGS. 9A and 9B, illustrated is a partial cross-sectional side view of another wellbore system 900 that may employ the principles of the present disclosure, according to one or more embodiments. Similar to the wellbore system 100 of FIG. 1, the wellbore system 900 includes a wellbore 902 that extends through various earth strata 904 from a sea floor 906. A subsea riser or conduit 908 extends from a wellhead installation 910 arranged on the sea floor 906. The wellbore 902 may be lined with casing 912 and secured in place with, for example, cement 914.

A wellbore tubing 916 may be extended into the wellbore 902 and may include any type of wellbore pipe, such as production tubing or drill pipe. The wellbore tubing 916 may be extended into the wellbore 902 and, as described herein, configured to mate with a completion assembly 918 already disposed or otherwise arranged within the wellbore 902. The completion assembly 918 may be similar to the completion 132 of FIG. 1 and, therefore, may include a completion receptacle 920 configured to receive, orient, and align the wellbore tubing 916. The completion receptacle 920 may further include, provide, or otherwise house a lower control line connector (not shown), such as the lower control line connector 200 of FIGS. 2 and 3. In some embodiments, such as the depicted embodiment, the lower control line connector may be arranged within the completion receptacle 920. In other embodiments, however, such as is described herein below with reference to FIGS. 13 and 14, the lower control line connector may be arranged on the exterior of the completion receptacle 920, without departing from the scope of the disclosure.

A lower control line 922 may extend downhole from the completion receptacle 920 so that it may be operably associated with one or more sand control screen assemblies, similar to the sand control screen assemblies 138a-d of FIG. 1. As with the lower control line 140 of FIG. 1, the lower control line 922 may extend along the exterior of the completion assembly 918 and may house and otherwise convey one or more communication media such as optical fibers, electrical conductors, hydraulic conduits, etc.

As illustrated, various wellbore tools and/or devices may be coupled to or otherwise arranged on the wellbore tubing 916 at various locations. For instance, a tubing hanger 924 may be arranged on the wellbore tubing 916 and configured to engage a reduced diameter portion of the wellhead installation 910, and thereby axially secure or "hang" the wellbore tubing 916 within the wellbore 902 from the wellhead installation 910. The wellbore tubing 916 may further include an upper isolation packer 926 and a travel joint 928. The upper isolation packer 926 may be configured to engage the inner wall of the wellbore 902 (i.e., the casing 912) and thereby provide fluid isolation between portions of the wellbore above and below the upper isolation packer 926. The travel joint 928 may be configured to expand and/or contract axially, thereby effectively lengthening and/or contracting the axial length of the wellbore tubing 916 such that the tubing hanger 924 may accurately locate and hang off the wellhead installation 910.

An anchor assembly 930 may also be arranged on the wellbore tubing 916 at or near a distal end thereof. The anchor assembly 930 may be similar to the anchor assembly 144 of FIG. 1. As described in more detail below, the anchor assembly 930 may be configured to be stabbed into and otherwise connected to the completion receptacle 920. Once properly connected to the completion receptacle 920, the anchor assembly 930 may be tested for connectivity, after which the travel joint 928 may telescope or "stroke" down to effectively shorten the axial length of the wellbore tubing 916 so that the tubing hanger 924 can locate and land on the wellhead installation 910. The upper isolation packer 926 may then be set to secure the wellbore tubing 916 within the wellbore 902.

An upper control line 932 may extend along the exterior of the wellbore tubing 916 and may be coupled or clamped to the production tubing 916 at various locations to prevent damage to the upper control line 932 during installation. The upper control line 932 may be similar to the upper control line 148 of FIG. 1 and may, therefore, include or otherwise house one or more communication media such as optical fibers, electrical conductors, hydraulic conduits, etc.

One or more dry mate connector assemblies 934 (two shown as first and second dry mate connector assemblies 934a and 934b) may be disposed on or otherwise arranged along the wellbore tubing 916. As described in more detail below, the dry mate connector assemblies 934a,b may be used to couple opposing lengths or portions of the upper control line 923 and thereby effectively extend the communication media further downhole along the exterior of the wellbore tubing 916. Each dry mate connector assembly 934a,b includes upper and lower dry mate connectors that may be made up (i.e., connected) on the rig floor during assembly of the wellbore tubing 916.

In some embodiments, as illustrated, the dry mate connector assemblies 934a,b may be arranged between axially adjacent components or wellbore tools arranged on the wellbore tubing 916. For example, the first dry mate connector assembly 934a may be axially arranged on the wellbore tubing 916 between the upper isolation packer 926 and the travel joint 928, and the second dry mate connector assembly 934b may be axially arranged on the wellbore tubing 916 between the travel joint 928 and the anchor assembly 930.

As will be appreciated by those skilled in the art, the dry mate connector assemblies 934a,b may be placed between components or wellbore tools arranged on the wellbore tubing 916 when a continuous length of the control line 932 cannot be used or is otherwise infeasible to use. More particularly, the control line 932 may be fed off a drum or spool to facilitate efficient installation on the wellbore tubing 916 in the minimum amount of time. Some equipment requires the control line 932 to be fed through a pressure port to make a pressure tight seal; i.e., the upper isolation packer 926. The control line 932 must be threaded through the pressure port and a fitting slipped on the control line 932 to make the fluid-tight seal. It would be quite difficult to feed upwards of 3,000 feet of control line 932 through the upper isolation packer 926. Accordingly, the control line 932 is alternatively severed before and after completion equipment that requires a pressure seal. Such equipment is shipped with a partial length of control line cable installed, and the dry mate connector assemblies 934a,b may provide a reliable means of connecting the control line 932 where severed.

The wellbore system 900 may further include an upper control line connector 936 coupled to or otherwise extending from the anchor assembly 930. The upper control line connector 936 may be similar to the upper control line connector 146 of FIG. 1 and, therefore, may be a wet mate connector or a dry mate connector, without departing from the scope of the disclosure. The upper and lower control lines 932, 922 may have the same type of communication media disposed therein such that energy and/or signals may be transmitted therebetween following proper connection. The lower control line connector disposed within (or without) the completion receptacle 920 may be configured to be operatively coupled to the upper control line connector 936, and thereby establish a continuous connection between the upper and lower control lines 932, 922.

Once properly connected, a sealed communication path is created between the wellbore tubing 916 and the completion assembly 918, thereby providing a fluid conduit to the surface for production fluids. In addition, as discussed herein, properly coupling the wellbore tubing 916 and the completion assembly 918 enables the communication media associated with the upper control line 932 to be operatively and communicably connected to the communication media associated with the lower control line 922. In the case of optical fibers, for instance, operatively coupling the upper control line 932 to the lower control line 922 may enable distributed temperature and/or seismic information along the completion assembly 918 to be obtained and transmitted to the surface during any subsequent wellbore operations.

Figure 10A:
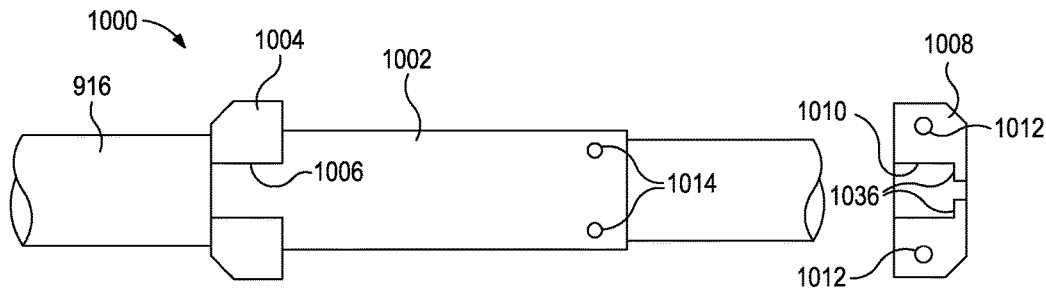
FIGS. 10A-10C illustrate various views of an exemplary dry mate connection assembly, according to one or more embodiments of the present disclosure.
Figure 10B:
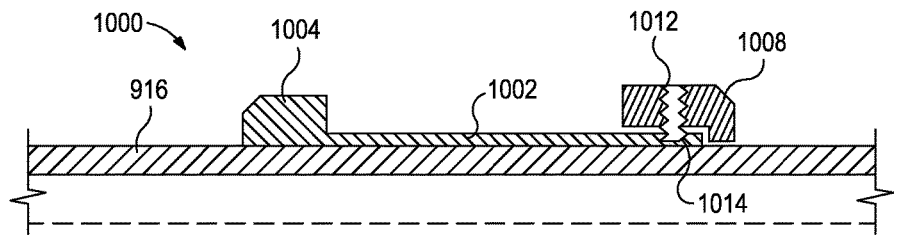
Figure 10C:
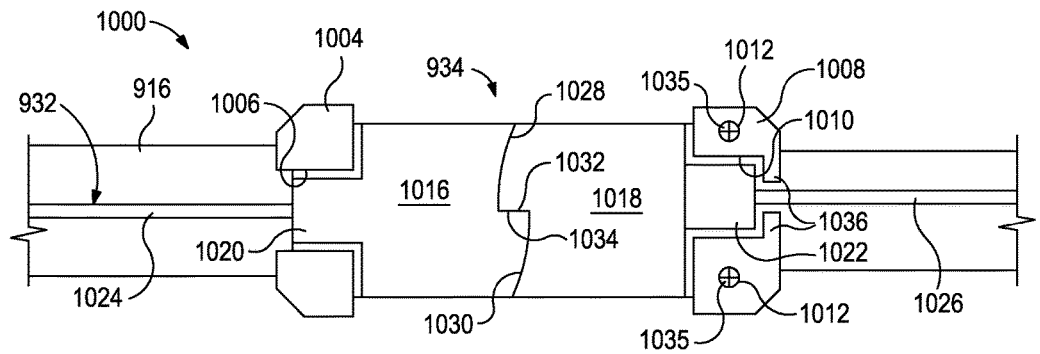

Referring now to FIGS. 10A-10C, with continued reference to FIGS. 9A-9B, illustrated are various views of an exemplary dry mate connection assembly 1000, according to one or more embodiments of the present disclosure. More particularly, FIG. 10A depicts an exploded plan view of the dry mate connection assembly 1000 (hereafter "assembly 1000"), FIG. 10B depicts a cross-sectional side view of the assembly 1000, and FIG. 10C depicts a plan view of the assembly 1000 securing a dry mate connector assembly 934. The assembly 1000 may be used to couple opposing ends of the upper control line 932 (FIG. 10C) via a dry mate connection. Accordingly, the assembly 1000 may be used to couple upper and lower dry mate connectors of one of the dry mate connector assemblies 934a,b of FIGS. 9A-9B, and thereby extend the upper control line 932 (FIGS. 9A-9B) further downhole within the wellbore 902 (FIGS. 9A-9B).

As illustrated in FIGS. 10A and 10B, the assembly 1000 may include a clamp base 1002 arranged about the outer surface of the wellbore tubing 916. In some embodiments, the clamp base 1002 may extend about the entire outer circumference of the wellbore tubing 916, and thereby form a sleeve-like sheath that can be coupled or otherwise attached to the wellbore tubing 916. In other embodiments, the clamp base 1002 may extend only partially about the outer circumference of the wellbore tubing 916. The clamp base 1002 may be coupled to the wellbore tubing 916 via a variety of coupling techniques including, but not limited to, welding, brazing, heat shrinking, mechanical fasteners (e.g., screws, bolts, rings, clamps, etc.), industrial adhesives, or any combination thereof. In at least one embodiment, however, the clamp base 1002 may not be coupled to the wellbore tubing 916, but may instead be free floating about the outer surface thereof, without departing from the scope of the disclosure.

The assembly 1000 may further include a clamp guide ring 1004 which, in some embodiments, may form an integral part of the clamp base 1002 and otherwise define a radial protrusion or extension that extends radially from the outer circumferential surface of the clamp base 1002. In other embodiments, however, the clamp guide ring 1004 may be coupled or otherwise attached to the outer circumferential surface of the clamp base 1002 via a variety of coupling techniques including, but not limited to, welding, brazing, heat shrinking, mechanical fasteners (e.g., screws, bolts, rings, clamps, etc.), industrial adhesives, or any combination thereof.

The clamp guide ring 1004 may be an annular ring disposed about the clamp base 1002 and may define an axial channel 1006. As discussed below, the axial channel 1006 may be used to accommodate or otherwise receive the splitter block of a dry mate connector. In other embodiments, the clamp guide ring 1004 may encompass two stanchions angularly offset from each other about the clamp base 1002, and the axial channel 1006 may be defined between the two stanchions. In yet other embodiments, the clamp base 1002 may be omitted altogether from the assembly 1000, and the clamp guide ring 1004 may instead be coupled directly to the outer surface of the wellbore tubing 916.

The assembly 1000 may further include a retaining ring 1008 configured to secure the dry mate connection for downhole use. Similar to the clamp guide ring 1004, the retaining ring 1008 may be an annular ring that defines or otherwise provides an axial channel 1010 used to accommodate or otherwise receive the splitter block of a dry mate connector. In some embodiments, the retaining ring 1008 may be a crimp ring configured to be crimped about the outer surface of the clamp base 1002 or the wellbore tubing 916 in order to secure the dry mate connection for downhole use. In other embodiments, however, the retaining ring 1008 may be mechanically fastened to the outer surface of the clamp base 1002 or the wellbore tubing 916 in order to secure the dry mate connection for downhole use.

More particularly, as illustrated, the retaining ring 1008 may define or otherwise provide one or more threaded holes 1012 configured to be aligned with one or more threaded holes 1014 defined in the clamp base 1002. Once properly aligned, corresponding mechanical fasteners (not shown), such as screws or bolts, may be extended into the threaded holes 1012, 1014 in order to secure the dry mate connection for downhole use. In embodiments where the clamp base 1002 is omitted from the assembly 1000, the threaded holes 1014 may alternatively be defined in the wellbore tubing 916, without departing from the scope of the disclosure. In yet other embodiments, the threaded holes 1014 may be omitted from the assembly 1000, and the threaded mechanical fasteners may instead be configured to directly penetrate the clamp base 1002 or the wellbore tubing 916 during installation.

Referring now to FIG. 10C, the assembly 1000 is depicted as securing the dry mate connector assembly 934 to the wellbore tubing 916. The dry mate connector assembly 934 may be substantially similar to the control line connector assembly 500 described above with reference to FIGS. 5 and 6 and therefore will be best understood with reference thereto. More particularly, the dry mate connector assembly 934 may include an upper dry mate connector 1016 substantially similar to the upper connector 146 of FIGS. 5-6, and a lower dry mate connector 1018 substantially similar to the lower connector 200 of FIGS. 5-6. Moreover, the upper and lower dry mate connectors 1016 and 1018 may include upper and lower splitter blocks 1020 and 1022, respectively, that are substantially similar to the upper and lower splitter blocks 504 and 204 of FIGS. 5-6, respectively. A first or upper portion 1024 of the upper control line 932 may extend from the upper splitter block 1020, and a second or lower portion 1026 of the upper control line 932 may extend from the lower splitter block 1022.

While the terms "upper" and "lower" are used in conjunction with the upper dry mate connector 1016 and the lower dry mate connector 1018, respectively, those skilled in the art will readily appreciate that such directional terms are not to limit the present disclosure, and are used only for reference and differentiation. Rather, the directional configurations of the upper dry mate connector 1016 and the lower dry mate connector 1018 may be reversed, without departing from the scope of the disclosure. Accordingly, since directional configuration is irrelevant, the upper and lower dry mate connectors 1016, 1018 may alternatively be characterized as first and second dry mate connectors, respectively, or vice versa.

In some embodiments, the upper dry mate connector 1016 may include a pin connector (not shown) substantially similar to the pin connector 510 of FIGS. 5, 6, 7A-7B, and 8A-8B, and the lower dry mate connector 1018 may include a box connector (not shown) substantially similar to the box connector 210 of FIGS. 5, 6, 7A-7B, and 8A-8B. In other embodiments, the disposition of the pin and box connectors may be reversed, without departing from the scope of the disclosure. The upper dry mate connector 1016 may define or otherwise provide an upper axial mating face 1028 configured to engage a lower axial mating face 1030 of the lower dry mate connector 1018. As illustrated, the upper and lower axial mating faces 1028, 1030 may be angled or otherwise complementarily spiraled such that they are helically-aligned similar to the engagement of mechanical threads.

The upper dry mate connector 1016 may further define or otherwise provide an upper angular mating face 1032 configured to engage a lower angular mating face 1034 of the lower dry mate connector 1018. The upper and lower angular mating faces 1032, 1034 may be substantially similar to the box and pin mating faces 212, 512 of FIGS. 5 and 6. In some embodiments, for instance, the upper angular mating face 1032 may be similar to the pin mating face 512 and the lower angular mating face 1034 may be similar to the box mating face 212, or vice versa.

To establish a connection between the upper and lower dry mate connectors 1016, 1018, the clamp base 1002 may first be arranged on the wellbore tubing 916 at a location where the dry mate connector assembly 934 is to be mounted or disposed. The upper dry mate connector 1016 may then be arranged on the clamp base 1002, and the upper splitter block 1020 located within the axial channel 1006 of the clamp guide ring 1004. In embodiments where the clamp base 1002 is omitted, the clamp guide ring 1004 may instead be coupled directly to the wellbore tubing 916 and the upper dry may connector 1016 may then be arranged such that the upper splitter block 1020 is located within the axial channel 1006 of the clamp guide ring 1004.

The lower dry mate connector 1018 may then be brought into proximity of the upper dry mate connector and the upper and lower axial mating faces 1028, 1030 may be brought into axial engagement. This may be accomplished by moving the lower dry mate connector 1018 axially until the lower axial mating face 1030 engages the upper axial mating face 1028. Once the upper and lower axial mating faces 1028, 1030 are axially engaged, one or both of the upper and lower dry mate connectors 1016, 1018 may be angularly rotated with respect to each other in order in order to bring the upper and lower angular mating faces 1032, 1034 into angular engagement with each other. The angle or curvature of each axial mating face 1028, 1030 allows the upper and lower dry mate connectors 1016, 1018 to be aligned axially and rotated until the upper angular mating face 1032 is rotationally engaged with the lower angular mating face 1034. As generally described above with reference to FIGS. 5, 6 7A-7B, and 8A-8B, further angular rotation of one or both of the upper and lower dry mate connectors 1016, 1018 may serve to establish a connection between the communication media of the upper and lower portions 1024, 1026 of the upper control line 932.

Once connection between the upper and lower dry mate connectors 1016, 1018 is established, the retaining ring 1008 may then be used to secure the connection. More particularly, the retaining ring 1008 may be moved axially along the wellbore tubular 916 until the lower splitter block 1022 is located within the axial channel 1010. In some embodiments, the axial channel 1010 of the retaining ring 1008 may include a shoulder 1036 configured to engage the axial end of the lower splitter block 1022. The shoulder 1036 may allow the lower portion 1026 of the upper control line 932 to extend through the axial channel 1010, but prevent the lower splitter block 1022 from doing so.

Once the shoulder 1036 is placed in axial engagement with the axial end of the lower splitter block 1022, the retaining ring 1008 may be secured against movement. In some embodiments, as described above, the retaining ring 1008 may be crimped to the outer surface of the clamp base 1002 or the wellbore tubing 916 in order to secure the dry mate connector assembly 934. In other embodiments, however, corresponding mechanical fasteners 1035 (i.e., screws, bolts, etc.) may be threaded into the threaded holes 1012, 1014. In other embodiments, the mechanical fasteners 1035 may be threaded into the threaded holes 1012 and penetrate the clamp base 1002 or the wellbore tubing 916 in order to form the threaded holes 1014.

Because of its helical design, the dry mate connector assembly 934 may exhibit an outer diameter that is smaller than conventional dry mate connections. For instance, conventional dry mate connections add approximately an additional 1.5 inches in diameter to the wellbore tubing 916, whereas the exemplary dry mate connector assembly 934 of the present disclosure adds only about 0.375 inches in diameter to the wellbore tubing 916. In some embodiments, the outer diameter of the clamp guide ring 1004 and the retaining ring 1008 may be slightly larger than the outer diameter of the dry mate connector assembly 934. As a result, the clamp guide ring 1004 and the retaining ring 1008 may be configured to protect the upper and lower dry mate connectors 1016, 1018 from being damaged during run-in into the wellbore 902 (FIGS. 9A-9B).

Referring now to FIG. 11, with continued reference to FIGS. 9A and 9B, illustrated is an enlarged side view of the anchor assembly 930 and upper control line connector 936, according to one or more embodiments. As illustrated, the anchor assembly 930 may include a mandrel 1102 that extends longitudinally from the wellbore tubing 916 (FIGS. 9A-9B) and otherwise from a locator sub 1106 coupled to the wellbore tubing 916. The upper control line connector 936 (hereafter "the upper connector 936") may be generally arranged at the distal end of the mandrel 1102.

The anchor assembly 930 may further include a plurality of longitudinally-extending collet latch fingers 1104 arranged about the mandrel 1102 and extending from the locator sub 1106. As discussed below, the collet latch fingers 1104 may be configured to locate and engage a corresponding collet profile defined on the inner walls of the completion receptacle 920 (FIG. 9B), and thereby accurately position the anchor assembly 930 with respect to the completion assembly 918 (FIG. 9B).

The anchor assembly 930 may also include a seal assembly 1108, similar to the seal assembly 142 of FIG. 1. The seal assembly 1108 may include a plurality of seal rings 1110 (three shown as first, second, and third seal rings 1110a, 1110b and 1110c). Each seal ring 1110a-c may include a metal ring body and at least two radial seals 1112 molded or otherwise disposed thereon. The radial seals 1112 may be made of a material selected from the following: elastomeric materials, non-elastomeric materials, metals, composites, rubbers, ceramics, derivatives thereof, and any combination thereof. In some embodiments, the radial seals 1112 may be O-rings or the like. In other embodiments, however, the radial seals 1112 may be a set of v-rings or CHEVRON® packing rings, or other appropriate seal configurations (e.g., seals that are round, v-shaped, u-shaped, square, oval, t-shaped, etc.), as generally known to those skilled in the art, or any combination thereof.

The seal rings 1110a-c may be configured to help facilitate the transfer of one or more communication media from the upper control line 932 (FIGS. 9A-9B) extending along the wellbore tubing 916 (FIGS. 9A-9B) to the lower control line 922 (FIGS. 9A-9B) extending along the completion assembly 918 (FIGS. 9A-9B). In one embodiment, for instance, communication media in the form of one or more hydraulic conduits 1114 (shown as first and second hydraulic conduits 1114a and 1114b) may be conveyed to corresponding hydraulic ports 1116 defined in the mandrel 1102 between axially adjacent seal rings 1110a-c. The radial seals 1112 may prevent hydraulic fluid conveyed within the hydraulic conduits 1114a,b and to the hydraulic ports 1116 from migrating past the seal rings 1110a-c in either axial direction. Rather, the hydraulic fluid may be sealed between axially adjacent seal rings 1110a-c and thereby conveyed to corresponding hydraulic ports associated with the completion receptacle 920 (FIG. 9B).

In another embodiment, communication media in the form of one or more electrical conductors 1118 (one shown) may be conveyed to or otherwise electrically coupled to one or more of the seal rings 1110a-c. More particularly, the electrical conductors 1118 may be conveyed to electrical connectors 1120 disposed between axially adjacent radial seals 1112 on one or more of the seal rings 1110a-c. In at least one embodiment, the radial seals 1112 may be molded or bonded directly onto the electrical connectors 1120. In the depicted embodiment, the electrical conductor 1118 is conveyed to the electrical connector 1120 of each seal ring 1110a-c, but may alternatively be conveyed to less than each seal ring 1110a-c, without departing from the scope of the disclosure. Upon stabbing the anchor assembly 930 into the completion receptacle 920 (FIG. 9B), the electrical connectors 1120 may be configured to make an electrical connection with corresponding electrical receptors associated with the completion receptacle 920. Such an electrical connection may be much like a brush-type electrical connection.

As mentioned above, the upper connector 936 may be a wet mate or dry mate connector configured to mate with a lower control line connector disposed within the completion receptacle 920 (FIG. 9B) and thereby establish a continuous connection between one or more communication media of the upper and lower control lines 932, 922 (FIGS. 9A-9B). In the illustrated embodiment, the upper connector 936 is a wet mate connector used to convey communication media in the form of one or more optical fibers 1122. In other embodiments, however, the upper connector 936 may equally accommodate one or more hydraulic conduits 1114a,b and/or electrical conductors 1118, without departing from the scope of the disclosure.

The optical fibers 1122 may extend within the mandrel 1102 until entering the upper connector 936 at a corresponding splitter block (not shown). In at least one embodiment, as illustrated, the optical fibers 1122 may exit the mandrel 1102 and subsequently be helically wrapped or coiled about the mandrel 1102 prior to entering the upper connector 936. Helically wrapping the optical fibers 1122 about the mandrel 1102 may allow the upper connector 936 to rotate, as described below, without severing or compromising the optical fibers 1122. The optical fibers 1122 may extend within the upper connector 936 until reaching an angular mating face 1124 and corresponding connector. In some embodiments, the connector may be a pin connector, such as the pin connector 510 of FIGS. 5 and 6. In other embodiments, however, the connector may be a box connector, such as the box connector 210 of FIGS. 2-6, without departing from the scope of the disclosure.

As illustrated the upper connector 936 may further include a rotation guide 1126 configured to guide the upper connector 936 into angular engagement with a lower control line connector (not shown) of the completion receptacle 920 (FIG. 9B). More particularly, the upper connector 936 may be movably mounted on the mandrel 1102 and otherwise able to rotationally translate with respect to the mandrel 1102. One or more radial bearings or bushings (not shown) may be arranged between the upper connector 936 and the mandrel 1102 in order to help facilitate rotational movement of the upper connector 936.

In one embodiment, as illustrated, the rotation guide 1126 may include an arcuate groove 1128 defined in the housing 1130 (similar to the housings 201, 501 of FIGS. 5 and 6) of the upper connector 936. A rotation pin 1132 may be coupled to the mandrel 1102 and extend radially outward therefrom and through the arcuate groove 1128. As the upper connector 936 rotates with respect to the mandrel 1102, the rotation pin 1132 may follow the arcuate groove 1128 to guide the upper connector 936 in its rotation and also limit the amount of angular rotation that the upper connector 936 may assume.

In exemplary operation, when axial compression is applied on the distal end of the upper connector 936, such as when the upper connector 936 is moved into axial engagement with a lower control line connector, the upper connector 936 may be urged to rotate in the direction A. More particularly, the distal end of the upper connector 936 may include an axial mating face 1134 similar to the axial mating faces 514a,b of FIG. 5 and, therefore, angled or otherwise helically spiraled. Upon engaging a complimentarily spiraled axial mating face (not shown) of the lower control line connector, the opposing angled axial mating faces may allow the axial loading assumed by the upper connector 936 to be converted into angular rotation in the direction A as the axial mating faces slidingly engage each other.

In other embodiments, however, as will be discussed below with reference to FIG. 15, the rotation guide 1126 may include and otherwise encompass a helical ring and shroud engagement, without departing from the scope of the disclosure. The helical ring and shroud engagement may operate in a substantially similar manner to allow the upper connector 936 to rotate with respect to the mandrel 1102 and mate with a lower control line connector. In yet other embodiments, the rotation guide 1126 may be omitted and the upper connector 936 may instead be physically rotated from a surface location via interconnection with the mandrel 1102 and the wellbore tubing 916 (FIGS. 9A-9B).

Referring now to FIG. 12, with continued reference to FIGS. 9A-9B and 11, illustrated is a cross-sectional side view of the anchor assembly 930 as engaged with or otherwise coupled to the completion receptacle 920 of FIG. 9B, according to one or more embodiments. As illustrated, the upper control line 932 extends to the anchor assembly 930 and one or more communication media may extend into the locator sub 1106 and/or the mandrel 1102. Similarly, one or more communication media may extend within the completion receptacle 920 to the lower control line 922, which extends from the completion receptacle 920 and further downhole along the exterior of the completion assembly 918 (FIG. 9B).

In order to mate or otherwise couple the anchor assembly 930 to the completion receptacle 920, the anchor assembly 930 may be extended or "stabbed" into the completion receptacle 920 in an axial direction B. As the anchor assembly 930 extends into the completion receptacle 920, the seal rings 1110a-c may engage a seal bore 1202 defined on an inner wall of the completion receptacle 920. The radial seals 1112 (FIG. 11) of the seal rings 1110a-c may be configured to generate fluidic seals against the seal bore 1202 so that fluids are unable to migrate in either axial direction across the seal rings 1110a-c. Continued movement of the anchor assembly 930 in the direction B allows the collet latch fingers 1104 arranged about the mandrel 1102 to locate and engage a corresponding collet profile 1204 defined on the inner wall of the completion receptacle 920. In at least one embodiment, the collet profile 1204 may be a threaded profile. With the collet latch fingers 1104 engaged with the collet profile 1204, the anchor assembly 930 will be generally prevented from moving in a direction opposite the direction B.

In some embodiments, the anchor assembly 930 may continue in the direction B until an anchor shoulder 1205 defined on the mandrel 1102 engages an opposing receptacle shoulder 1207 defined on the completion receptacle 920 and stops the axial movement. In any event, stabbing the anchor assembly 930 into the completion receptacle 920 may serve to axially align the seal rings 1110a-c with corresponding hydraulic ports and electrical connection means provided on the seal bore 1202. As illustrated, the seal rings 1110a-c may be configured to communicably couple the one or more hydraulic conduits 1114a,b with corresponding hydraulic conduits 1206a,b arranged or otherwise provided in the completion receptacle 920. The hydraulic conduits 1206a,b may then extend to the lower control line 922, thereby effectively extending the hydraulic communication media from the upper control line 932 to the lower control line 922.

Similarly, the seal rings 1110a-c may be configured to communicably couple the one or more electrical conductors 1118 with one or more corresponding electrical conductors 1208 arranged or otherwise provided on the seal bore 1202. Transfer of electricity between the electrical conductors 1118, 1208 may be accomplished via the corresponding electrical connectors 1120 (FIG. 11) of each seal ring 1110a-c. More particularly, upon stabbing the anchor assembly 930 into the completion receptacle 920, the electrical connectors 1120 facilitate electrical communication between the corresponding electrical conductors 1118, 1208 much like a brush-type electrical connection. The electrical conductors 1208 may then extend to the lower control line 922, thereby effectively extending the electrical communication media from the upper control line 932 to the lower control line 922.

As illustrated, the completion receptacle 920 may further include a lower control line connector 1210 arranged therein and otherwise configured to mate with the upper connector 936. The lower control line connector 1210 (hereafter "the lower connector 1210") may be substantially similar to the lower control line connector 200 of FIGS. 2, 3, and 4A and therefore may be best understood with reference thereto. Mating the upper and lower connectors 936, 1210 may serve to effectively extend the optical fibers 1122 from the upper control line 932 to the lower control line 922.

As described above, the upper connector 936 may be configured to rotate with respect to the mandrel 1102 upon assuming an axial load while the anchor assembly 930 is stabbed into the completion receptacle 920. More particularly, as the anchor assembly 930 moves in the direction B, the axial mating face 1134 of the upper connector 936 may eventually engage a corresponding axial mating face 1212 defined on the lower connector 1210. Similar to the axial mating face 1134, the axial mating face 1212 of the lower connector 1210 may be angled or otherwise helically spiraled such that axial engagement of the complimentarily spiraled axial mating faces 1134, 1212 may convert the axial loading assumed by the upper connector 936 into angular rotation whereby the axial mating faces 1134, 1212 slidingly engage each other.

Since the upper and lower connectors 936, 1210 may be substantially similar to the upper and lower connectors 146, 200 described herein above, mating and otherwise communicably coupling the upper and lower connectors 936, 1210 may be accomplished as generally described above with reference to FIGS. 5, 6, 7A-7B, and 8A-8B, and therefore will not be described again in detail.

In some embodiments, the anchor assembly 930 may further include a spring 1214 arranged between the mandrel 1102 and the housing 1130 of the upper connector 936. The spring 1214 may be a helical compression spring configured to bias the upper connector 936 back to its run-in configuration upon disconnection with the lower connector 1210. Moreover, as briefly mentioned above, while FIGS. 11 and 12 depict only the optical fibers 1122 being extended through the upper and lower connectors 936, 1210, it will be appreciated that the upper and lower connectors 936, 1210 may equally accommodate one or more hydraulic conduits 1114a,b and/or electrical conductors 1118, without departing from the scope of the disclosure.

Figure 13:
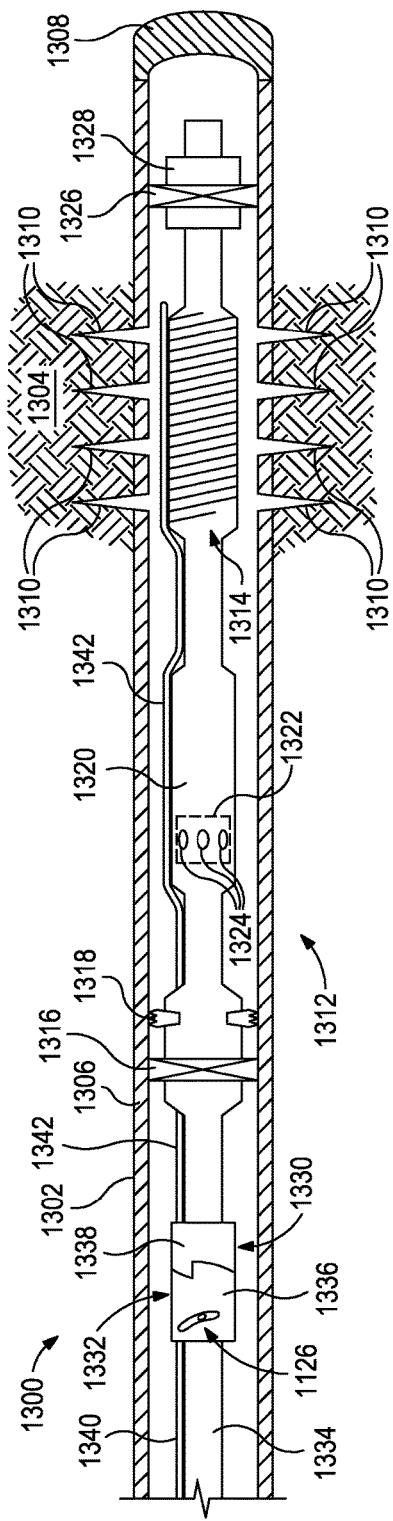
FIG. 13 illustrates a cross-sectional side view of another wellbore system that may employ the principles of the present disclosure, according to one or more embodiments.

Referring now to FIG. 13, with continued reference to FIGS. 9A-9B, 11, and 12, illustrated is a partial cross-sectional side view of another wellbore system 1300 that may employ one or more principles of the present disclosure. The wellbore system 1300 may include a wellbore 1302 extending through various earth strata and penetrating at least one subterranean formation 1304. The wellbore 1302 may be lined with casing 1306 and secured in place with, for example, cement (not shown). In at least one embodiment, a cement plug 1308 may be formed at the bottom of the casing 1306. In other embodiments, however, the wellbore system 1300 may be deployed or otherwise operated in an open-hole section of the wellbore 1302, without departing from the scope of the disclosure. One or more perforations 1310 may be formed in the casing 1306 at or near the formation 1304 and configured to provide fluid communication between the formation 1304 and the interior of the wellbore 1302.

As illustrated, a completion assembly 1312 may be extended into the wellbore 1302 and may include one or more sand control screen assemblies 1314 (one shown) similar to the sand control screen assemblies 138a-d of FIG. 1. In at least one embodiment, the completion assembly 1312 may be a gravel pack completion and, therefore, may be referred to herein as a gravel pack completion 1312. The gravel pack completion 1312 may include a gravel pack packer 1316 including slips 1318 configured to support the gravel pack completion 1312 within the casing 1306 when deployed.

Disposed below the gravel pack packer 1316 is a circulating valve assembly 1320 that may include a circulating sleeve 1322 (shown in dashed lines) movably arranged therein. The circulating sleeve 1322 may be movable between a closed position, where the circulating sleeve 1322 occludes one or more flow ports 1324 defined in the circulating valve assembly 1320, and an open position, where the circulating sleeve 1322 has moved axially to expose the one or more flow ports 1324. In some embodiments, a sump packer 1326 may be disposed below the sand control screen assemblies 1314 around a lower seal assembly 1328. The gravel pack completion 1312 may be lowered into the wellbore 1302 until engaging the sump packer 1326. In other embodiments, the gravel pack completion 1312 may be lowered into the wellbore 1302 and stung into the lower seal assembly 1328. In yet other embodiments, the sump packer 1326 may be omitted from the wellbore system 100 and the tubing may instead be blanked off at its bottom end. In yet other embodiments, the sump packer 1326 may be an isolation packer between zones in a multi-zone gravel pack system. In at least one embodiment, the gravel pack completion 1312 may be a completion with stand-alone screens where the well is not gravel packed. Moreover, the sump packer 1326 may be an open hole packer separating open hole zones with stand-alone screens.

The gravel pack completion 1312 may further include a completion receptacle 1330 arranged at its proximal or uphole end. The completion receptacle 1330 may be configured to receive and otherwise mate with an anchor assembly 1332 extended within the wellbore 1302 on wellbore tubing 1334. The anchor assembly 1332 may include an upper control line connector 1336 configured to mate with a lower control line connector 1338 associated with the completion receptacle 1330. The operation and design of the upper and lower control line connectors 1336, 1338 may be substantially similar to the upper and lower connectors 146, 200 of FIGS. 5, 6, 7A-7B, and 8A-8B and therefore will not be described again in detail.

In some embodiments, as illustrated, the upper and lower control line connectors 1336, 1338 may be arranged or otherwise disposed on the exterior of the anchor assembly 1332 and the completion receptacle 1330, respectively. In other embodiments, however, the upper and lower control line connectors 1336, 1338 may be arranged within the anchor assembly 1332 and the completion receptacle 1330, respectively, similar to the configuration of the upper and lower connectors 936, 1210 of FIGS. 11 and 12. In some embodiments, as illustrated, the upper control line connector 1336 may include the rotation guide 1126, described above with reference to FIG. 11, and configured to guide the upper control line connector 1336 into angular mating engagement with the lower control line connector 1338.

As illustrated, an upper control line 1340 may extend to the upper control line connector 1336 (hereafter "the upper connector 1336"), and a lower control line 1342 may extend downhole from the lower control line connector 1338 (hereafter "the lower connector 1338"). The upper and lower control lines 1340, 1342 may be configured to house and otherwise convey one or more communication media (e.g., optical fibers, electrical conductors, hydraulic conduits, etc.). The upper and lower connectors 1336, 1338 may be configured to mate, as described herein, so that the communication media can be effectively extended from the upper control line 1340 to the lower control line 1342 and further downhole within the wellbore 1302. In the case of optical fibers as communication media, for instance, operatively coupling or mating the upper and lower connectors 1336, 1338 may enable the real-time collection of distributed temperature and/or seismic information along the gravel pack completion 1312 during any subsequent wellbore operations, and such information may be transmitted to the surface for consideration by a well operator.

In some embodiments, the gravel pack completion 1312 may be run into and installed in the wellbore 1302, following which a gravel packing treatment may be undertaken to prepare the wellbore 1302 for production operations. Following the gravel packing treatment, the wellbore tubing 1334 may be extended downhole until the anchor assembly 1332 is stabbed into or otherwise coupled and sealed into the completion receptacle 1330. During this process the upper connector 1336 may be rotated into mating engagement with the lower connector 1338, and thereby communicating the lower control line 1342 with the upper control line 1340.

Figure 14:
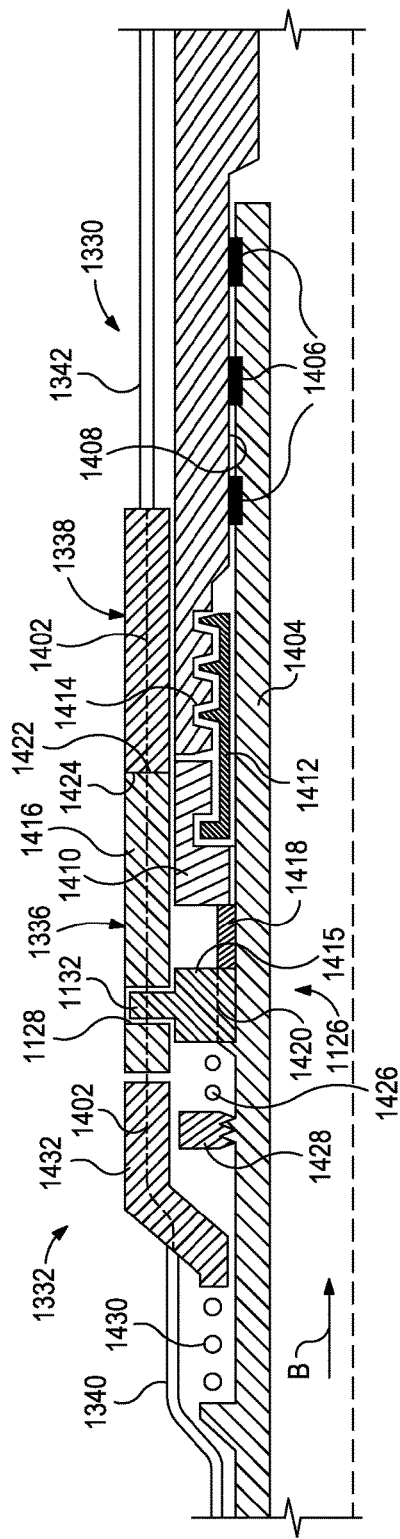
FIG. 14 illustrates a cross-sectional side view of the anchor assembly and completion receptacle of FIG. 13, according to one or more embodiments.

Referring now to FIG. 14, with continued reference to FIG. 13, illustrated is cross-sectional side view of the anchor assembly 1332 as engaged with the completion receptacle 1330, according to one or more embodiments. As illustrated, the upper and lower control line connectors 1336, 1338 are depicted as being arranged or otherwise disposed on the exterior of the anchor assembly 1332 and the completion receptacle 1330, respectively. The upper control line 1340 extends to the anchor assembly 1332 and one or more communication media 1402 may extend from the upper control line 1340 and into the upper connector 1336. Similarly, one or more communication media 1402 may extend from the lower connector 1338 to the lower control line 1342, which extends further downhole past the completion receptacle 1330 along the exterior of the gravel pack completion 1323 (FIG. 13). While the communication media 1402 may encompass any of the communication media discussed herein, in the illustrated embodiment, the communication media 1402 may be optical fibers.

As illustrated, the anchor assembly 1332 may include a mandrel 1404 having one or more seals 1406 disposed on an outer surface thereof. The seals 1406 may be similar to the radial seals 1112 of FIG. 11 and therefore configured to generate a fluidic seal against a seal bore 1408 defined on an inner wall of the completion receptacle 1330 so that fluids are unable to migrate in either axial direction. In other embodiments, the seals 1406 may alternatively be arranged on the seal bore 1408, without departing from the scope of the disclosure.

The anchor assembly may further include a locator sub 1410 and a plurality of longitudinally-extending collet latch fingers 1412 arranged about the mandrel 1404 and extending from the locator sub 1410. The collet latch fingers 1412 may be configured to locate and engage a corresponding collet profile 1414 defined on the inner walls of the completion receptacle 1330, and thereby accurately position the anchor assembly 1332 with respect to the gravel pack completion 1312 (FIG. 13). In at least one embodiment, the collet profile 1414 may be a threaded profile.

The upper connector 1336 may be movably mounted on the mandrel 1404 and otherwise able to rotationally translate with respect to the mandrel 1404. One or more radial bearings or bushings (not shown) may be arranged between the upper connector 1336 and the mandrel 1404 in order to help facilitate rotational movement of the upper connector 1336.

As illustrated, the rotation guide 1126 includes the rotation pin 1132 as extended through the arcuate groove 1128 defined in a housing 1416 (similar to the housings 201, 501 of FIGS. 5 and 6) of the upper connector 1336. In some embodiments, the rotation pin 1132 may be coupled to or otherwise extending radially from a splined ring 1415. The splined ring 1415 may be movably disposed about the mandrel 1404 and otherwise movably arranged on one or more splines 1418 defined on the mandrel 1404. The splines 1418 may extend axially along the mandrel 1404 and through corresponding grooves 1420 defined axially through the splined ring 1415.

To mate or otherwise couple the anchor assembly 1332 to the completion receptacle 1330, the anchor assembly 1332 may be extended or "stabbed" into the completion receptacle 1330 in the axial direction B. As the anchor assembly 1332 extends into the completion receptacle 1330, the seals 1406 may engage and seal against the seal bore 1408. Continued movement of the anchor assembly 1332 in the direction B allows the collet latch fingers 1412 arranged about the mandrel 1404 to locate and engage the corresponding collet profile 1414 defined on the inner wall of the completion receptacle 1330. With the collet latch fingers 1412 engaged with the collet profile 1414, the anchor assembly 1332 will generally be prevented from moving in a direction opposite the direction B.

The upper connector 1336 may be configured to rotate with respect to the mandrel 1404 upon assuming an axial load while the anchor assembly 1332 is stabbed into the completion receptacle 1330. More particularly, as the anchor assembly 1332 moves in the direction B, an axial mating face 1422 of the upper connector 1336 may eventually engage a corresponding axial mating face 1424 defined on the lower connector 1210. The axial mating faces 1422, 1424 may be angled and/or otherwise helically spiraled such that axial engagement of the complimentarily spiraled axial mating faces 1422, 1424 may convert the axial loading assumed by the upper connector 1336 into angular rotation whereby the axial mating faces 1422, 1424 slidingly engage each other.

Once an axial load is applied on the upper connector 1336, as axially engaging the lower connector 1338, the splined ring 1415 and associated rotation pin 1132 begins to translate axially along the splines 1418. Moving the splined ring 1415 along the splines 1418 urges the upper connector to rotate as the rotation pin 1132 follows the arcuate groove 1128 defined in the housing 1416. Rotation of the upper connector 1336, in turn, provides mating engagement with the lower connector 1338. The upper and lower connectors 1336, 1338 may be substantially similar to the upper and lower connectors 146, 200 described herein above. Accordingly, mating and otherwise communicably coupling the upper and lower connectors 1336, 1338 may be accomplished as generally described above with reference to FIGS. 5, 6, 7A-7B, and 8A-8B, and therefore will not be described again in detail.

In some embodiments, the anchor assembly 1332 may further include a first spring 1426 arranged between the splined ring 1415 and a stop ring 1428 disposed about the mandrel 1404 uphole from the splined ring 1415. The spring 1426 may be a helical compression spring configured to bias the splined ring 1415 and, therefore, the upper connector 1336 back to its run-in configuration upon disconnection with the lower connector 1338. In some embodiments, a second spring 1430 may be used to maintain a shroud 1432 axially engaged with the upper connector 1336 so that debris is prevented from obstructing the axial translation of the splined ring 1415 along the splines 1418.

Figure 15:
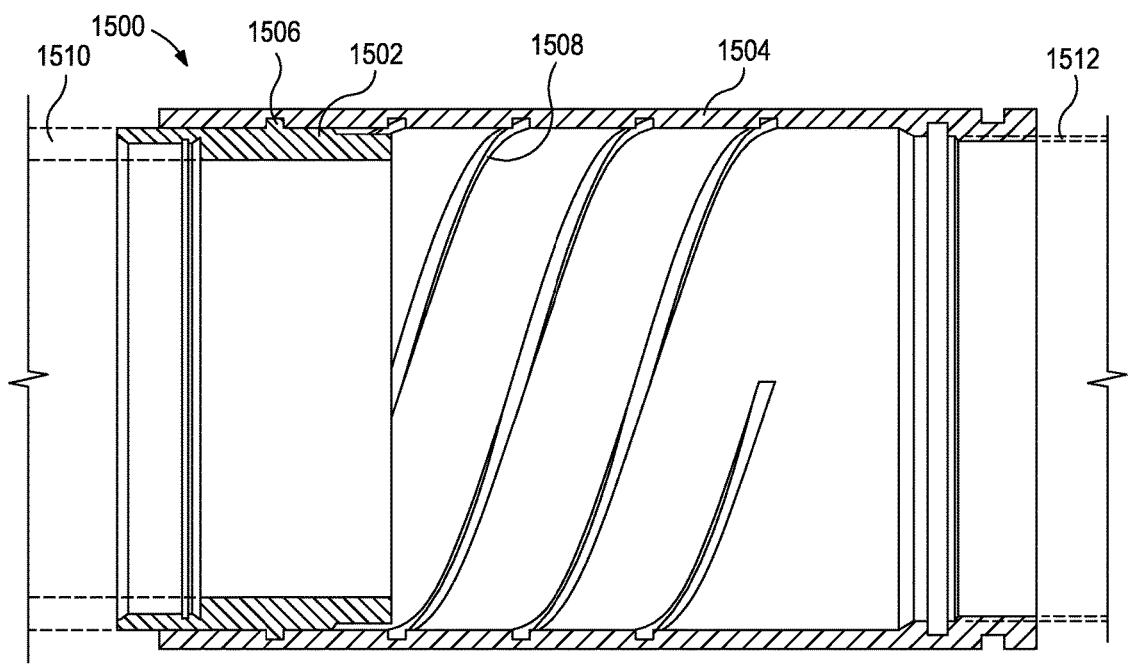
FIG. 15 illustrates an exemplary rotation guide that may be used in conjunction with the anchor assemblies of FIGS. 11 and 13, according to one or more embodiments.

Referring now to FIG. 15, illustrated is an exemplary rotation guide 1500 that may be used in conjunction with one of the above-described anchor assemblies 930, 1332, according to one or more embodiments. The rotation guide 1500 may be similar in some respects to the rotation guide 1126 of FIG. 11. More particularly, the rotation guide 1500 may be configured to guide an upper connector (e.g., one of the upper connectors 146, 936, 1336) into angular engagement with a lower connector (e.g., of the lower connectors 200, 1210, 1338) associated with one of the completion receptacles 920, 1330 (FIGS. 9B and 13).

As illustrated, the rotation guide 1500 may include a helical ring 1502 movably coupled to a helical shroud 1504. The helical ring 1502 may include a helical protrusion 1506 defined on its outer surface and configured to slidingly engage a helical groove 1508 defined in the inner surface of the helical shroud 1504. The helical ring 1502 may be coupled or otherwise attached to a mandrel 1510 (e.g., the mandrels 1102, 1404 of FIGS. 11 and 14, respectively), and the helical shroud 1504 may be coupled or otherwise attached to an upper connector 1512 (e.g., the upper connectors 936, 1336 of FIGS. 11 and 14, respectively).

Once an axial load is applied on the upper connector 1512, as axially engaging a lower connector (not shown), for example, the helical shroud 1504 may be urged to rotate with respect to the helical ring 1502, and thereby having the upper connector 1512 rotate with respect to the mandrel 1510. Rotation of the upper connector 1512, in turn, provides mating engagement with the lower connector, as described herein above.

Figure 16A:
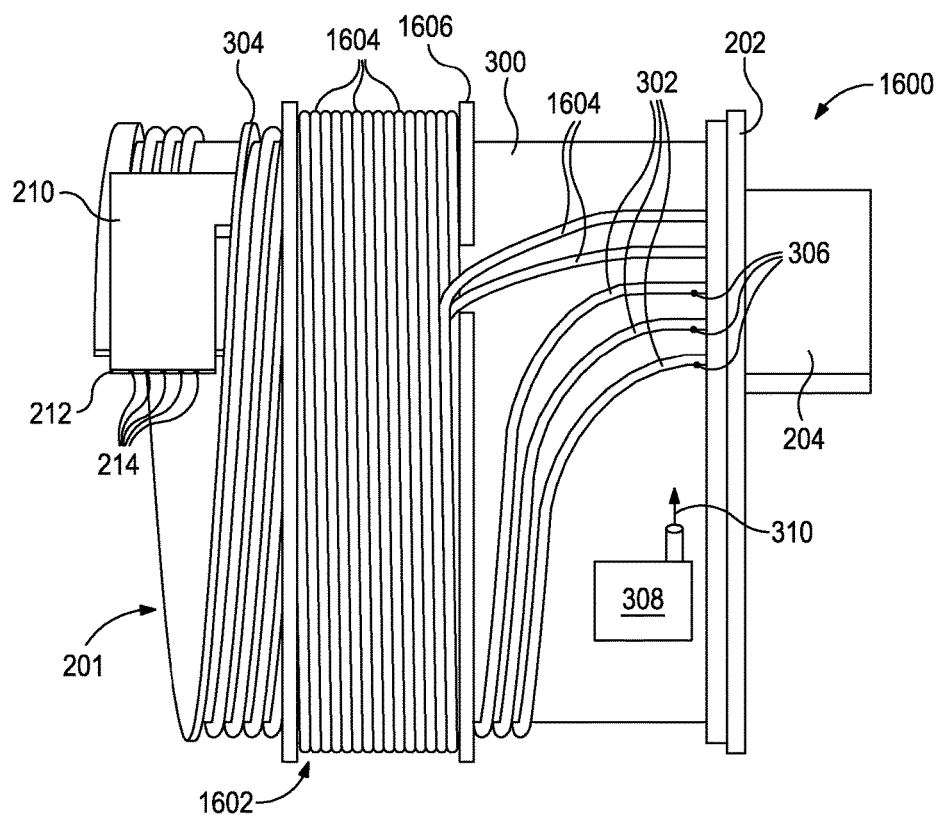
FIGS. 16A and 16B illustrate views of another exemplary connector, according to one or more embodiments.

Referring now to FIG. 16A, illustrated is an exposed side view of another exemplary connector 1600, according to one or more embodiments. The connector 1600 may be either an upper connector, similar to the upper connector 146 of FIG. 1, or a lower connector, similar to the lower connector 200 of FIGS. 2, 3, and 4A. For purposes of this discussion, however, the connector 1600 may be similar to the lower connector 200 of FIGS. 2, 3, and 4A and therefore will be best understood with reference thereto, where like numerals represent like elements not described again in detail. Similar to the lower connector 200 of FIGS. 2, 3, and 4A, the connector 1600 may include the conduit chamber 300 defined within the lower housing 201 between the body 202 and the shroud 206 (FIG. 2). Three tubular conduits 302 are depicted as being arranged within the conduit chamber 300 and extend from the splitter block 204 to the box connector 210. Each tubular conduit 302 may be configured to house a separate communication medium, such as an optical fiber or hydraulic fluid.

Unlike the lower connector 200, however, the connector 1600 may further include an induction coil 1602 helically wrapped around the body 202. In some embodiments, as illustrated, the induction coil 1602 may be arranged about the body 202 radially outward from the helically-wrapped tubular conduits 302 and the ribs 304. The induction coil 1602 may comprise one or more electrical conductors 1604 (two shown) wound multiple times about an induction housing 1606. In the illustrated embodiment, the induction housing 1606 is depicted as being disposed radially-outward from the tubular conduits 302 and the ribs 304. In other embodiments, however, the induction housing 1606 and/or the electrical conductors 1604 may be arranged at other locations on the connector 1600, without departing from the scope of the disclosure. For instance, in at least one embodiment, the induction coil 1602 may be generally arranged at the end of the connector 1600, such as adjacent the box connector 210. Such an embodiment may prove advantageous in applications that use wired drill pipe, which often uses an inductive coil at the threads to make an electrical connection along with a mechanical threaded connection. In such embodiments, the matable induction coils may be communicably coupled either in the axial direction or when rotationally coupled.

The electrical conductors 1604 may be made of any material that current is able to flow through. In at least one embodiment, for example, the electrical conductors 1604 are made of copper wire and may be insulated. In other embodiments, however, the electrical conductors 1604 may be made of aluminum and may comprise wires or strips of graphene and carbon fiber nanotubes, without departing from the scope of the disclosure The induction housing 1606 may be made of any rigid materials including, but not limited to, plastic, aluminum, stainless steel, and brass. In other embodiments, the induction housing 1606 may be made of a ferritic material or a ceramic-magnetic material, both of which may help increase the electromagnetic transmission range in the radial direction for the induction coil 1602.

Figure 16B:
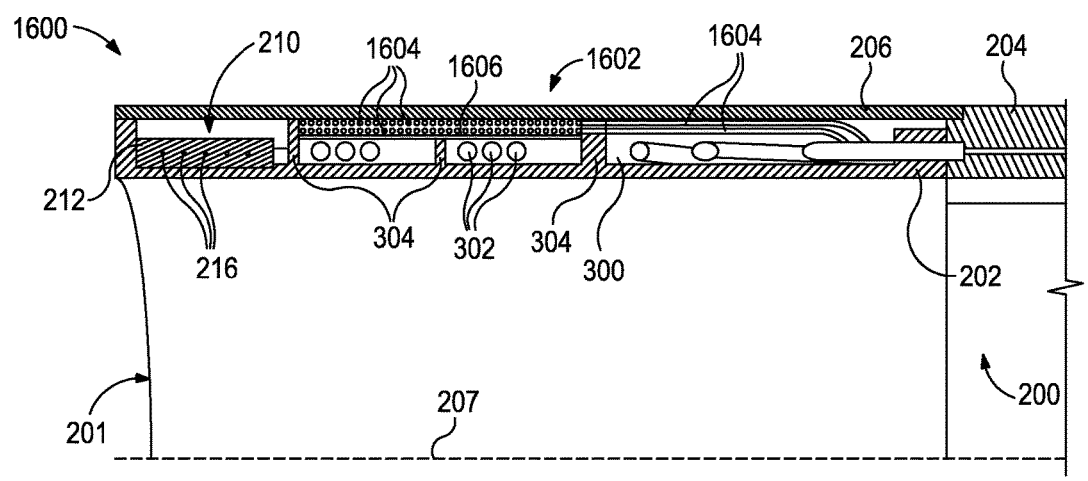

Referring now to FIG. 16B, illustrated is a partial side cross-sectional view of the lower housing 201 and the splitter block 204 of the connector 1600. As depicted in FIG. 16B, the induction coil 1602 is encased within the connector 1600 beneath the shroud 206. In some embodiments, the shroud 206 may be made of a non-magnetic material such as, but not limited to, plastic, Teflon, or other elastomers, aluminum, stainless steel, or brass so that electromagnetic transmission from the induction coil 1602 will not be impeded. Moreover, the induction housing 1606 is shown as separating the electrical conductors 1604 from the tubular conduits 302.

According to the present disclosure, the induction coil 1602 may be configured to be communicably coupled (i.e., inductively coupled) to a second induction coil on an adjacent matable connector. Accordingly, when the connector 1600 is communicably coupled with a mating connector, such the upper connector 146 as is described above with reference to FIGS. 5 and 6, the mating connector may include a second induction coil (not shown) configured to inductively mate with the induction coil 1602. The design and configuration of the second induction coil may be similar to the design and configuration of the induction coil 1602 as described herein and otherwise include one or more conductors helically wound multiple times about an induction housing.

Once inductively coupled with the second induction coil, the first induction coil 1602 may be able to transfer electrical power and/or signals thereto without requiring physical contact between the two induction coils. The strength of the inductive coupling between two induction coils can be increased by placing them close together on a common axis, such as the central axes 507, 207 of the upper and lower housings 501, 201 of FIG. 5, so that the magnetic field of the first induction coil 1602 passes through the second induction coil.

In an alternative embodiment, the induction coil 1602 may be connected to an oscillating circuit that produces a resonant magnetic field. In such embodiments, the electrical conductors 1604 and the induction housing 1606 may be more compact in size since a ferritic material is not needed. The secondary or receiving induction coil may be connected to a resistive load with a distributed capacitance. The two induction coils may be tuned to operate at the same resonant frequency, and the resonant coupling of the two magnetic fields in the induction coils enables the efficient transfer of electrical power. Moreover, resonant coupling allows the two induction coils to be spaced radially or axially apart, without departing from the scope of the disclosure.

Referring now to FIGS. 17A and 17B, with continued reference to FIGS. 16A and 16B, illustrated is an enlarged side view of another embodiment of the anchor assembly 930 and the upper control line connector 936 described above with reference to FIGS. 9A-9B, 11, and 12. The anchor assembly 930 and the upper control line connector 936 (hereafter "the upper connector 936") are essentially the same as described above, and therefore like numerals represent like elements that will not be described again.

Unlike the anchor assembly 930 and the connector 936 described above, however, an induction coil 1702 may be included in the connector 936. The induction coil 1702 may be similar to the induction coil 1602 of FIGS. 16A and 16B and, therefore, may include one or more electrical conductors 1704 wound multiple times about an induction housing (not labeled). Similar to the electrical conductors 1604, the electrical conductors 1704 may be made of any material that current is able to flow through such as, but not limited to, copper wire. Moreover, the associated induction housing may be made of a material that allows electromagnetic transmission in the radial direction and may include, but is not limited to, plastic, aluminum, stainless steel, brass, a ferritic material, a ceramic-magnetic material, and any combination thereof.

Along with the optical fibers 1122, the electrical conductors 1704 may comprise communication media extended within the mandrel 1102 until entering the upper connector 936 at a corresponding splitter block (not shown). In at least one embodiment, as illustrated, the optical fibers 1122 and the electrical conductors 1704 may exit the mandrel 1102 and subsequently be helically wrapped or coiled about the mandrel 1102 prior to entering the upper connector 936. Helically wrapping the optical fibers 1122 and the electrical conductors 1704 about the mandrel 1102 may allow the upper connector 936 to rotate, as described above, without severing or compromising the optical fibers 1122 and the electrical conductors 1704.

Referring now to FIG. 17B, with continued reference to FIG. 17A, illustrated is a cross-sectional side view of the anchor assembly 930 and the connector 936 of FIG. 17A as engaged with or otherwise coupled to the completion receptacle 920 of FIG. 9B, according to one or more embodiments. As illustrated, the upper control line 932 extends to the anchor assembly 930 and one or more communication media may extend into the locator sub 1106 and/or the mandrel 1102. Similarly, one or more communication media may extend within the completion receptacle 920 to the lower control line 922, which extends from the completion receptacle 920 and further downhole along the exterior of the completion assembly 918 (FIG. 9B).

Moreover, the lower completion receptacle 920 further includes an inductive coil 1706 configured to inductively mate with the inductive coil 1702. The inductive coil 1706 may be similar to the inductive coil 1702 and may include one or more electrical conductors 1708 wound multiple times about an induction housing (not labeled). Mating the anchor assembly 930 to the completion receptacle 920 or, in other words, mating the connector upper control line connector 936 with the lower control line connector 1210, may be accomplished as described above, and therefore will not be repeated here. At least one difference, however, is that upon mating the upper and lower control line connectors 936, 1210, the first induction coil 1702 may be inductively coupled to the second induction coil 1706 and thereby able to transfer electrical power and/or signals thereto without having physical contact therebetween. The strength of the inductive coupling between two induction coils 1702, 1706 can be increased by tuning the first and second induction coils 1702, 1706 to resonate at the same frequency.

Referring now to FIGS. 18A and 18B, with continued reference to FIGS. 16A-16B and 17A-17B, illustrated is an enlarged side view of another embodiment of the anchor assembly 930 and the upper connector 936 described above with reference to FIGS. 9A-9B, 11, and 12. As with the embodiment shown in FIGS. 17A-17B, the anchor assembly 930 and the upper connector 936 are essentially the same as described above, and therefore like numerals represent like elements that will not be described again in detail. Unlike the anchor assembly 930 and the connector 936 described above, however, an induction coil 1802 may be included in the anchor assembly 930.

The induction coil 1802 may be similar to the induction coils 1602 and 1702 of FIGS. 16A-16B and 17A-17B, respectively, and therefore may include one or more electrical conductors 1804 wound multiple times about an induction housing 1805. Similar to the electrical conductors 1604, the electrical conductors 1804 may be made of any material that current is able to flow through such as, but not limited to, copper wire. Moreover, the induction housing 1805 may be made of a material that allows electromagnetic transmission in the radial direction and may include, but is not limited to, plastic, aluminum, stainless steel, brass, a ferritic material, a ceramic-magnetic material, and any combination thereof. The electrical conductors 1804 may comprise communication media extended within the mandrel 1102 until entering the induction housing 1805 whereupon they may be helically wrapped about the housing 1805 multiple times.

Referring now to FIG. 18B, with continued reference to FIG. 18A, illustrated is a cross-sectional side view of the anchor assembly 930 and the connector 936 of FIG. 18A as engaged with or otherwise coupled to the completion receptacle 920 of FIG. 9B, according to one or more embodiments. As illustrated, the upper control line 932 extends to the anchor assembly 930 and one or more communication media may extend into the locator sub 1106 and/or the mandrel 1102. Similarly, one or more communication media may extend within the completion receptacle 920 to the lower control line 922, which extends from the completion receptacle 920 and further downhole along the exterior of the completion assembly 918 (FIG. 9B).

Moreover, the lower completion receptacle 920 further includes an inductive coil 1806 configured to inductively mate with the inductive coil 1802. The second inductive coil 1806 may be similar to the first inductive coil 1802 and may include one or more electrical conductors 1808 wound multiple times about an induction housing (not labeled). Upon stabbing the anchor assembly 930 into the completion receptacle 920, the first induction coil 1802 may be inductively coupled to the second induction coil 1806 and thereby able to transfer electrical power and/or signals thereto without having physical contact therebetween. The strength of the inductive coupling between two induction coils 1802, 1806 can be increased by tuning the first and second induction coils 1802, 1706 to resonate at the same frequency.

As will be appreciated, the foregoing embodiments describing inductive coupling may prove especially advantageous in wire drill pipe applications. In such applications, the inductive coupling may facilitate the transfer of data and power along the drill pipe and into casing assemblies and the like that extend even further downhole.

Embodiments disclosed herein include:

A. A connector that includes a housing having a conduit chamber defined therein between a body and a shroud, a matable connector at least partially disposed within the housing and providing a mating face that faces tangentially with respect to the housing so as to mate tangentially with an opposing matable connector, and a splitter block coupled to the housing and conveying one or more communication media into the conduit chamber to communicate with the matable connector.

B. A connector assembly that includes a first connector having a first housing and a pin connector at least partially disposed within the first housing, the pin connector providing a pin mating face that faces tangentially with respect to the first housing, a second connector configured to mate with the first connector and having a second housing and a box connector at least partially disposed within the second housing, the box connector providing a box mating face that faces tangentially with respect to the second housing, a first control line length operatively coupled to the first housing and providing one or more first communication media that extend through the first housing to the pin connector, and a second control line length operatively coupled to the second housing and providing one or more second communication media that extend through the second housing to the box connector, wherein the one or more first communication media is communicably coupled to the one or more second communication media by angularly rotating one or both of the first and second connectors with respect to each other to engage the pin mating face against the box mating face and subsequently mate the pin connector to the box connector.

Each of embodiments A and B may have one or more of the following additional elements in any combination: Element 1: further comprising one or more tubular conduits arranged within the conduit chamber and extending from the splitter block to the matable connector, the one or more tubular conduits providing corresponding passageways for the one or more communication media to communicate with the matable connector. Element 2: wherein the one or more tubular conduits are helically wrapped around the body. Element 3: wherein the one or more tubular conduits are wrapped around the body for at least one of a ¼ revolution, a ½ revolution, one revolution, two revolutions, three revolutions, and more than three revolutions. Element 4: further comprising one or more ribs arranged within the conduit chamber. Element 5: wherein the one or more ribs comprise a rib length that proceeds along a continuous helical path around the body, the control line connector further comprising a helical passageway defined between axially adjacent portions of the continuous rib length, wherein the one or more tubular conduits are helically wrapped around the body within the helical passageway. Element 6: further comprising an optical gel disposed within the conduit chamber, a gel inlet defined in at least one of the one or more tubular conduits that allows the optical gel to flow into the at least one of the one or more tubular conduits and to the matable connector, and a gel reservoir fluidly coupled to the conduit chamber and configured to supply additional optical gel into the conduit chamber. Element 7: wherein the gel reservoir houses a fluid actuator configured to pump the additional optical gel into the conduit chamber. Element 8: wherein the splitter block further comprises a control line port configured to receive and seat a control line, one or more tubular conduit ports configured to receive and seat the one or more tubular conduits, and one or more communication media pathways extending between the control line port and the one or more tubular conduit ports, each communication media pathway being configured to receive and convey a separate communication medium from the control line port to the one or more tubular conduits. Element 9: wherein the separate communication medium in at least one of the one or more communication media pathways is an optical fiber, and wherein the splitter block further comprises a pressure seal made on the optical fiber at or near a corresponding one of the one or more tubular conduit ports. Element 10: wherein the one or more communication media are communication media selected from the group consisting of optical fibers, electrical conductors, and hydraulic fluid. Element 11: wherein the matable connector is a box connector comprising one or more holes defined in the mating face, one or more needle guides defined within the box connector and extending from the one or more holes, and one or more alignment features defined within the box connector and extending from the one or more needle guides. Element 12: wherein the mating face is sealed to prevent an influx of debris into the one or more holes with at least one of a lid and plugs disposed within the one or more holes. Element 13: wherein at least one of the one or more alignment features comprises a milled, cast, or molded channel defined in the box connector. Element 14: wherein at least one of the one or more alignment features comprises three or more elongate rods packed together and defining an elongate gap therebetween. Element 15: wherein the matable connector is a pin connector comprising one or more hypodermic tubes extending from the pin connector, and a retractable cover having the mating face defined on an end thereof and being movable between an extended configuration, where the one or more hypodermic tubes are arranged within the retractable cover, and a retracted configuration, where the one or more hypodermic tubes penetrate the mating face. Element 16: further comprising a first splitter block coupled to the first housing and configured to operatively couple the first control line length to the first housing and convey the one or more first communication media into the first housing, and a second splitter block coupled to the second housing and configured to operatively couple the second control line length to the second housing and convey the one or more second communication media into the second housing. Element 17: further comprising a first conduit chamber defined within the first housing between a first body and a first shroud that extends about the first body, a second conduit chamber defined within the second housing between a second body and a second shroud that extends about the second body, one or more first tubular conduits arranged within the first conduit chamber and extending from the first splitter block to the pin connector, the one or more first tubular conduits providing corresponding passageways for the one or more first communication media to communicate with the pin connector, and one or more second tubular conduits arranged within the second conduit chamber and extending from the second splitter block to the box connector, the one or more second tubular conduits providing corresponding passageways for the one or more second communication media to communicate with the box connector. Element 18: wherein the one or more first tubular conduits are helically wrapped around the first body, and wherein the one or more second tubular conduits are helically wrapped around the second body. Element 19: further comprising optical gel disposed within the second conduit chamber, a gel inlet defined in at least one of the one or more second tubular conduits that allows the optical gel to flow into the at least one of the one or more second tubular conduits and to the box connector, and a gel reservoir fluidly coupled to the second conduit chamber and configured to supply additional optical gel into the second conduit chamber. Element 20: wherein the first housing further defines a first axial mating face and the second housing further defines a second axial mating face, and wherein the first axial mating face engages the second axial mating face upon mating the first and second connectors. Element 21: wherein the first and second axial mating faces are complementarily angled. Element 22: wherein the one or more first and second communication media are communication media selected from the group consisting of optical fibers, electrical conductors, and hydraulic fluid. Element 23: further comprising one or more holes defined in the box mating face of the box connector, a retractable cover arranged on the pin connector, the pin mating face being defined on an end of the retractable cover, and one or more hypodermic tubes extending from the pin connector and configured to extend into the one or more holes when the pin connector mates with the box connector, wherein the retractable cover is movable between an extended configuration, where the one or more hypodermic tubes are arranged within the retractable cover, and a retracted configuration, where the pin mating face engages the box mating face and the one or more hypodermic tubes penetrate the pin mating face and extend into the one or more holes. Element 24: wherein the box mating face is sealed to prevent an influx of debris into the one or more holes. Element 25: wherein the box mating face is sealed with at least one of a lid and plugs disposed within the one or more holes, the one or more hypodermic tubes being further configured to penetrate the lid and plugs in order to extend into the one or more holes. Element 26: further comprising one or more needle guides defined within the box connector and extending from the one or more holes, and one or more alignment features defined within the box connector and extending from the one or more needle guides, wherein the one or more needle guides align the one or more hypodermic tubes with the one or more alignment features, and wherein each alignment feature is configured to align a corresponding one of the one or more first communication media extending from the pin connector with a corresponding one of the one or more second communication media extending within the box connector. Element 27: wherein at least one of the one or more alignment features comprises a milled, cast, or molded channel defined in the box connector. Element 28: wherein at least one of the one or more alignment features comprises three or more elongate rods packed together and defining an elongate gap therebetween, wherein the elongate gap aligns the corresponding one of the one or more first communication media extending from the pin connector with the corresponding one of the one or more second communication media extending within the box connector.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A connector of a wellbore completion, the connector comprising:
    a housing having a conduit chamber defined therein between a body and a shroud;
    a matable connector at least partially disposed within the housing and providing a mating face that faces with respect to the housing so as to angularly engage and mate with an opposing matable connector, the matable connector including one or more communication media disposed within the conduit chamber and extending to the mating face; and
    one or more tubular conduits extending helically from the mating face into the conduit chamber and wrapping helically around the body.

2. The connector of claim 1, further comprising:
    a splitter block coupled to the housing and conveying the one or more communication media into the conduit chamber; and
    one or more tubular conduits arranged within the conduit chamber and extending from the splitter block to the matable connector, the one or more tubular conduits providing corresponding passageways for the one or more communication media to communicate with the matable connector.

3. The connector of claim 2, wherein the one or more tubular conduits are helically wrapped around the body.

4. The connector of claim 3, wherein the one or more tubular conduits are wrapped around the body for up to a ¼ revolution, a ½ revolution, one revolution, two revolutions, three revolutions, or four revolutions.

5. The connector of claim 2, further comprising one or more ribs arranged within the conduit chamber.

6. The connector of claim 5, wherein the one or more ribs comprise a rib length that proceeds along a continuous helical path around the body, the connector further comprising a helical passageway defined between axially adjacent portions of the continuous rib length, wherein the one or more tubular conduits are helically wrapped around the body within the helical passageway.

7. The connector of claim 1, further comprising:
    an optical gel disposed within the conduit chamber;
    a gel inlet defined in at least one of the one or more tubular conduits that allows the optical gel to flow into the at least one of the one or more tubular conduits and to the matable connector; and
    a gel reservoir fluidly coupled to the conduit chamber and configured to supply additional optical gel into the conduit chamber.

8. The connector of claim 7, wherein the gel reservoir houses a fluid actuator configured to pump the additional optical gel into the conduit chamber.

9. The connector of claim 1, further comprising a splitter block coupled to the housing and conveying the one or more communication media into the conduit chamber, wherein the splitter block comprises:
    a control line port configured to receive and seat a control line;
    one or more tubular conduit ports configured to receive and seat the one or more tubular conduits; and
    one or more communication media pathways extending between the control line port and the one or more tubular conduit ports, each communication media pathway being configured to receive and convey a separate communication medium from the control line port to the one or more tubular conduits.

10. The connector of claim 9, wherein the separate communication medium in at least one of the one or more communication media pathways is an optical fiber, and wherein the splitter block further comprises a pressure seal made on the optical fiber at or near a corresponding one of the one or more tubular conduit ports.

11. The connector of claim 1, wherein the one or more communication media are communication media selected from the group consisting of optical fibers, electrical conductors, and hydraulic fluid.

12. The connector of claim 1, wherein the matable connector is a box connector comprising:
    one or more holes defined in the mating face;
    one or more needle guides defined within the box connector and extending from the one or more holes; and
    one or more alignment features defined within the box connector and extending from the one or more needle guides.

13. The connector of claim 12, wherein the mating face is sealed with at least one of a lid and plugs disposed within the one or more holes.

14. The connector of claim 12, wherein at least one of the one or more alignment features comprises a milled, cast, or molded channel defined in the box connector.

15. The connector of claim 12, wherein at least one of the one or more alignment features comprises three or more elongate rods packed together and defining an elongate gap therebetween.

16. The connector of claim 1, wherein the matable connector is a pin connector comprising:
    one or more hypodermic tubes extending from the pin connector; and
    a retractable cover having the mating face defined on an end thereof and being movable between an extended configuration, where the one or more hypodermic tubes are arranged within the retractable cover, and a retracted configuration, where the one or more hypodermic tubes penetrate the mating face.

17. The connector of claim 1, wherein the one or more communication media transfer at least one of data, power, and hydraulic control.

18. The connector of claim 1, further comprising an induction coil having one or more electrical conductors wrapped around the body to be inductively coupled to a second induction coil of the opposing matable connector.

19. The connector of claim 18, wherein the one or more electrical conductors are wrapped around the body with an induction housing disposed between the body and the shroud.

20. A connector assembly of a wellbore completion, the connector assembly comprising:
    a first connector having a first housing and a pin connector at least partially disposed within the first housing, the pin connector providing a pin mating face;
    a second connector configured to mate with the first connector and having a second housing and a box connector at least partially disposed within the second housing, the box connector providing a box mating face;
    one or more first tubular conduits extending helically from the pin mating face into a first conduit chamber of the first housing and about a first body of the first housing;
    one or more second tubular conduits extending helically from the box mating face and into a second conduit chamber of the second housing and about a second body of the second housing;
a first control line length operatively coupled to the first housing and providing one or more first communication media that extend through the first housing to the pin connector; and
a second control line length operatively coupled to the second housing and providing one or more second communication media that extend through the second housing to the box connector,
wherein the one or more first communication media is communicably coupled to the one or more second communication media by angularly rotating one or both of the first and second connectors with respect to each other to engage the pin mating face against the box mating face and subsequently mate the pin connector to the box connector.

21. The assembly of claim 20, further comprising:
a first splitter block coupled to the first housing and configured to operatively couple the first control line length to the first housing and convey the one or more first communication media into the first housing; and
a second splitter block coupled to the second housing and configured to operatively couple the second control line length to the second housing and convey the one or more second communication media into the second housing.

22. The assembly of claim 21, further comprising:
a first conduit chamber defined within the first housing between a first body and a first shroud that extends about the first body;
a second conduit chamber defined within the second housing between a second body and a second shroud that extends about the second body;
one or more first tubular conduits arranged within the first conduit chamber and extending from the first splitter block to the pin connector, the one or more first tubular conduits providing corresponding passageways for the one or more first communication media to communicate with the pin connector; and
one or more second tubular conduits arranged within the second conduit chamber and extending from the second splitter block to the box connector, the one or more second tubular conduits providing corresponding passageways for the one or more second communication media to communicate with the box connector.

23. The assembly of claim 22, wherein the one or more first tubular conduits are helically wrapped around the first body, and wherein the one or more second tubular conduits are helically wrapped around the second body.

24. The assembly of claim 22, further comprising:
optical gel disposed within the second conduit chamber;
a gel inlet defined in at least one of the one or more second tubular conduits that allows the optical gel to flow into the at least one of the one or more second tubular conduits and to the box connector; and
a gel reservoir fluidly coupled to the second conduit chamber and configured to supply additional optical gel into the second conduit chamber.

25. The assembly of claim 20, wherein the first housing further defines a first axial mating face and the second housing further defines a second axial mating face, and wherein the first axial mating face engages the second axial mating face upon mating the first and second connectors.

26. The assembly of claim 25, wherein the first and second axial mating faces are complementarily angled.

27. The assembly of claim 20, wherein the one or more first and second communication media are communication media selected from the group consisting of optical fibers, electrical conductors, and hydraulic fluid.

28. The assembly of claim 20, further comprising:
one or more holes defined in the box mating face of the box connector;
a retractable cover arranged on the pin connector, the pin mating face being defined on an end of the retractable cover; and
one or more hypodermic tubes extending from the pin connector and configured to extend into the one or more holes when the pin connector mates with the box connector,
wherein the retractable cover is movable between an extended configuration, where the one or more hypodermic tubes are arranged within the retractable cover, and a retracted configuration, where the pin mating face engages the box mating face and the one or more hypodermic tubes penetrate the pin mating face and extend into the one or more holes.

29. The assembly of claim 28, wherein the box mating face is sealed to prevent an influx of debris into the one or more holes.

30. The assembly of claim 29, wherein the box mating face is sealed with at least one of a lid and plugs disposed within the one or more holes, the one or more hypodermic tubes being further configured to penetrate the lid and plugs in order to extend into the one or more holes.

31. The assembly of claim 28, further comprising:
one or more needle guides defined within the box connector and extending from the one or more holes; and
one or more alignment features defined within the box connector and extending from the one or more needle guides,
wherein the one or more needle guides align the one or more hypodermic tubes with the one or more alignment features, and
wherein each alignment feature is configured to align a corresponding one of the one or more first communication media extending from the pin connector with a corresponding one of the one or more second communication media extending within the box connector.

32. The assembly of claim 31, wherein at least one of the one or more alignment features comprises a milled, cast, or molded channel defined in the box connector.

33. The assembly of claim 31, wherein at least one of the one or more alignment features comprises three or more elongate rods packed together and defining an elongate gap therebetween, wherein the elongate gap aligns the corresponding one of the one or more first communication media extending from the pin connector with the corresponding one of the one or more second communication media extending within the box connector.

34. A connector assembly of a wellbore completion, the connector assembly comprising:
a first connector having a first housing and a pin connector at least partially disposed within the first housing, the pin connector providing a pin mating face that faces with respect to the first housing;
a second connector configured to mate with the first connector and having a second housing and a box connector at least partially disposed within the second housing, the box connector providing a box mating face;

a first control line length operatively coupled to the first housing and providing one or more first communication media that extend through the first housing to the pin connector;
a second control line length operatively coupled to the second housing and providing one or more second communication media that extend through the second housing to the box connector, wherein the one or more first communication media is communicably coupled to the one or more second communication media by angularly rotating one or both of the first and second connectors with respect to each other to engage the pin mating face against the box mating face and subsequently mate the pin connector to the box connector;
a first induction coil disposed within the first housing and comprising one or more first electrical conductors helically wrapped multiple times within the first housing; and
a second induction coil disposed within the second housing and comprising one or more second electrical conductors helically wrapped multiple times within the second housing,
wherein the first and second induction coils are inductively coupled when the first connector mates with the second connector.

* * * * *